US012011918B2

(12) United States Patent
Shiohara

(10) Patent No.: US 12,011,918 B2
(45) Date of Patent: Jun. 18, 2024

(54) RECORDING APPARATUS

(71) Applicant: Seiko Epson Corporation, Tokyo (JP)

(72) Inventor: Hiroshi Shiohara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 240 days.

(21) Appl. No.: 17/528,979

(22) Filed: Nov. 17, 2021

(65) Prior Publication Data

US 2022/0161579 A1 May 26, 2022

(30) Foreign Application Priority Data

Nov. 20, 2020 (JP) ................................ 2020-193325

(51) Int. Cl.
*B41J 15/04* (2006.01)
*B41J 29/02* (2006.01)

(52) U.S. Cl.
CPC ............. *B41J 15/044* (2013.01); *B41J 29/02* (2013.01)

(58) Field of Classification Search
CPC ... B41J 15/044; B41J 29/02; B41J 2/01; B41J 11/00; B65H 3/06; B65H 5/021; B65H 5/062; B65H 2701/1131; B65H 2801/03
See application file for complete search history.

(56) References Cited

U.S. PATENT DOCUMENTS

2012/0320396 A1* 12/2012 Kurahashi .......... H04N 1/00559 358/1.13

FOREIGN PATENT DOCUMENTS

JP H11-240637 9/1999

OTHER PUBLICATIONS

Machine Translation of “Image Forming Device”, Saito Yasunori, Sep. 22, 2005, Whole Document (Year: 2005).*

* cited by examiner

*Primary Examiner* — Lisa Solomon
(74) *Attorney, Agent, or Firm* — WORKMAN NYDEGGER

(57) ABSTRACT

A recording apparatus includes an apparatus body that includes a recording unit that performs recording on a medium, a medium cassette configured to slide in a first direction, and a second direction, a frame forming a plane that is along a lateral face of the apparatus body, and a support column portion located at an end of the frame in an apparatus width direction intersecting with the slide directions of the medium cassette and extending in a height direction of the apparatus body. The frame forms the plane that is along the lateral face of the apparatus body at a second direction side. The medium cassette has, at an end in the second direction, a protruding portion that protrudes in the second direction. An accommodating portion configured to accommodate the protruding portion is formed in the support column portion.

7 Claims, 20 Drawing Sheets

RECORDING APPARATUS

The present application is based on, and claims priority from JP Application Serial Number 2020-193325, filed Nov. 20, 2020, the disclosure of which is hereby incorporated by reference herein in its entirety.

BACKGROUND

1. Technical Field

Embodiments of the present disclosure relate to a recording apparatus that performs recording on a medium.

2. Related Art

In some recording apparatuses configured to perform recording on a medium, a medium cassette for containing sheets of the medium inside is provided such that the medium cassette can be drawn out from, and can be housed into, the body of the apparatus. On some medium cassettes, a protruding portion that protrudes in a housing direction is provided as disclosed in, for example, JP-A-11-240637 to ensure that the medium cassette will not come off when drawn out from the body of the apparatus. The protruding portion gets caught on a guide rail along which the medium cassette is guided in a position-changing direction. This makes it possible to draw the medium cassette out from the body of the apparatus sufficiently.

However, providing the protruding portion described above causes an increase in the size of the apparatus. With reference to FIG. 20, problems that will be caused by providing a protruding portion on a medium cassette will now be explained.

In FIG. 20, the reference numeral 102 denotes a protruding portion provided on a medium cassette. The reference numeral 105 denotes a frame provided on the rear of the apparatus. The reference numeral 104 denotes support columns provided respectively on both ends of the frame 105. In FIG. 20, the Y-axis direction is defined as the direction of the depth of the apparatus. The direction from the front toward the rear of the apparatus is a +Y direction. The X-axis direction is defined as the direction of the width of the apparatus. The Z-axis direction is defined as the direction of the height of the apparatus.

In FIG. 20A, the protruding portion 102 of a medium cassette 101A is located at a position in the apparatus width direction where it overlaps with the support column 104. This overlap increases the size of the body 100A of the apparatus in the apparatus depth direction.

In FIG. 20B, the protruding portion 102 of a medium cassette 101B is located at a position in the apparatus depth direction where it overlaps with the support column 104. This overlap increases the size of the body 100B of the apparatus in the apparatus width direction.

In FIG. 20C, the protruding portion 102 of a medium cassette 101C is located at a position in the apparatus depth direction where it overlaps with the support column 104; in addition, the protruding portion 102 on one side and the protruding portion 102 on the opposite side are located at inner positions respectively with respect to the two support columns 104 as viewed in the apparatus width direction. Because of this structure, the body 100C of the apparatus is more compact than the body 100A of the apparatus and the body 100B of the apparatus described above. However, the two protrusions, namely, the protruding portion 102 on one side and the protruding portion 102 on the opposite side, occupy a part of a space between the two support columns 104. Therefore, it is impossible to arrange any other component at the occupied part of the space between the two support columns 104. Such occupying might make it difficult to reduce the size of the apparatus.

SUMMARY

A recording apparatus according to a certain aspect of the present disclosure includes: an apparatus body that includes a recording unit that performs recording on a medium; a medium cassette configured to contain the medium and configured to slide in a first direction and a second direction, the first direction being a direction in which the medium cassette is drawn out from the apparatus body, the second direction being an opposite of the first direction and being a direction in which the medium cassette is housed into the apparatus body; a base frame forming a plane that is along a lateral face of the apparatus body, the base frame being a constituent of the apparatus body; and a support column portion located at an end of the base frame in an apparatus width direction and extending in a height direction of the apparatus body, the apparatus width direction being a direction intersecting with the slide directions of the medium cassette; wherein the medium cassette has, at an end in the second direction, a protruding portion that protrudes in the second direction, and an accommodating portion configured to accommodate the protruding portion is formed in the support column portion.

DESCRIPTION OF EXEMPLARY EMBODIMENTS

Figure 1:
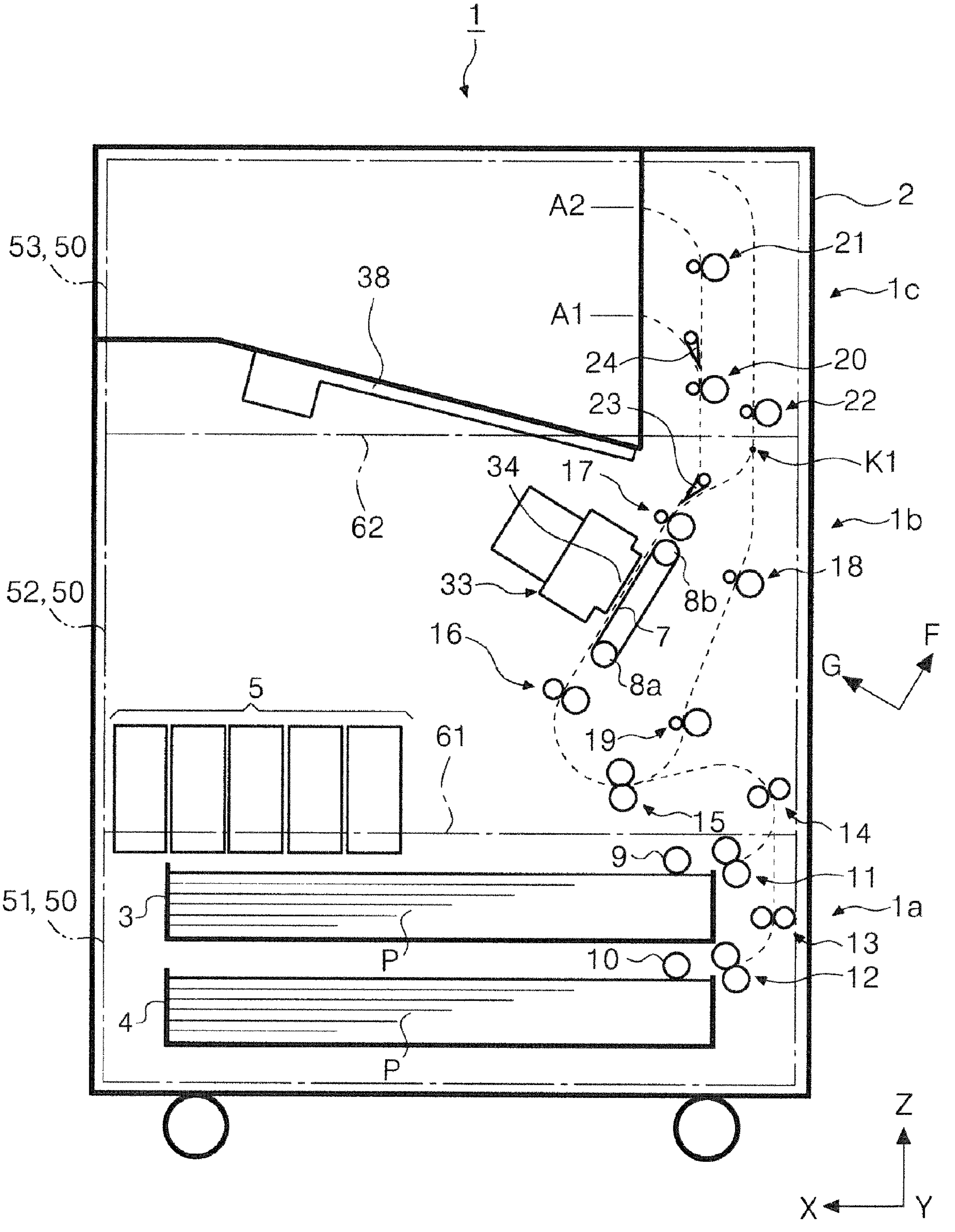
FIG. 1 is a diagram that illustrates a medium transportation path of a printer.

First, a brief overview of the present disclosure is presented below.

A recording apparatus according to a first mode includes: an apparatus body that includes a recording unit that performs recording on a medium; a medium cassette configured to contain the medium and configured to slide in a first direction and a second direction, the first direction being a direction in which the medium cassette is drawn out from the apparatus body, the second direction being an opposite of the first direction and being a direction in which the medium cassette is housed into the apparatus body; a frame forming a plane that is along a lateral face of the apparatus body, the frame being a constituent of the apparatus body; and a support column portion located at an end of the frame in an apparatus width direction and extending in a height direction of the apparatus body, the apparatus width direction being a direction intersecting with the slide directions of the medium cassette; wherein the frame forms the plane that is along the lateral face of the apparatus body at a side where the second direction goes, the medium cassette has, at an end in the second direction, a protruding portion that protrudes in the second direction, and an accommodating portion configured to accommodate the protruding portion is formed in the support column portion.

In the present mode, since the medium cassette has, at an end in the second direction, a protruding portion that protrudes in the second direction, and since an accommodating portion configured to accommodate the protruding portion is formed in the support column portion, it is possible to avoid an increase in the size of the apparatus as compared with a structure in which the protruding portion and the support column portion are shifted from each other in the horizontal direction.

A second mode is that, in the first mode, a part of the support column portion is formed as a bent portion of the frame.

Since a part of the support column portion is formed as a bent portion of the frame, the present mode makes it possible to manufacture the support column portion at low cost.

A third mode is that, in the second mode, a part of the support column portion is constituted by a reinforcement member attached to the frame.

With the present mode, the operational effect of the second mode described above can be obtained in a structure in which a part of the support column portion is constituted by a reinforcement member attached to the frame.

A recording apparatus according to a fourth mode further includes, in any of the first, second, and third modes: a power supply unit that is a power source for the apparatus body; a detection unit that detects a size of the medium contained in the medium cassette; a bottom plate driving unit that is a driver for elevating a bottom plate provided on the medium cassette; and a movement control unit that controls movement of the medium cassette when the medium cassette is housed into the apparatus body; wherein in a state in which the medium cassette is housed inside the apparatus body, at least a part of the protruding portion overlaps with at least one of the power supply unit, the detection unit, the bottom plate driving unit, or the movement control unit in the slide directions of the medium cassette.

Since at least a part of the protruding portion overlaps with at least one of the power supply unit, the detection unit, the bottom plate driving unit, or the movement control unit in the slide directions of the medium cassette, the present mode makes it possible to avoid an increase in the size of the apparatus.

A fifth mode is that, in any of the first to fourth modes, the frame is an integrated frame formed by welding a first metal sheet and a second metal sheet together, and at least a part of the accommodating portion is formed by bending the first metal sheet.

Since the frame is an integrated frame formed by welding a first metal sheet and a second metal sheet together, and since at least a part of the accommodating portion is formed by bending the first metal sheet, the present mode makes it possible to reduce the cost of manufacturing the frame. In addition, since the first metal sheet and the second metal sheet are joined together by welding, it is possible to prevent a decrease in the strength of the frame as a whole.

A recording apparatus according to a sixth mode further includes, in the fifth mode: a feeding unit located below the recording unit and configured to feed the medium toward the recording unit; wherein the second metal sheet is located above the first metal sheet, the first metal sheet supports the feeding unit, and the second metal sheet supports the recording unit.

In the present embodiment, the first metal sheet supports the feeding unit, and the second metal sheet supports the recording unit. That is, each metal sheet supports the functional region of the corresponding one of the feeding unit and the recording unit individually. Therefore, it is possible to prevent the positional displacement of parts inside each functional region, and it is possible to fulfill the function in each functional region properly.

Next, embodiments of the present disclosure will now be explained with specific examples.

An ink-jet printer 1 that performs recording by ejecting liquid such as ink toward a medium such as recording paper is described below as an example of a recording apparatus. In the description below, a shorter term "printer 1" is used for the ink-jet printer 1. The printer 1 may be regarded as a medium transportation apparatus because it is configured to transport a medium. Just to fulfill the function of a medium transportation apparatus alone, the printer 1 may be equipped with a line head 34 described later or not.

The X-Y-Z coordinate system shown in each of the accompanying drawings is an orthogonal coordinate system. The Y-axis direction of the coordinate system represents the medium width direction intersecting with the medium transportation direction. The medium width direction is the same as the apparatus depth direction. The +Y direction, in which the arrow of the Y axis is headed, is the direction from the front toward the rear of the apparatus. The −Y direction, which is the opposite of the +Y direction, is the direction from the rear toward the front of the apparatus. The −Y direction is an example of a first direction in which a first medium cassette 3 and a second medium cassette 4, which will be described later, are drawn out. The +Y direction is an example of a second direction in which the first medium cassette 3 and the second medium cassette 4 are retracted to be housed into the apparatus body 2.

The X-axis direction represents the apparatus width direction. As viewed from an operator of the printer 1, the +X direction, in which the arrow of the X axis is headed, is the direction toward the left-hand side, and the −X direction, which is the opposite thereof, is the direction toward the right-hand side. The Z-axis direction is the vertical direction, that is, the apparatus height direction. The +Z direction, in which the arrow of the Z axis is headed, is the direction going vertically upward. The −Z direction, which is the opposite thereof, is the direction going vertically downward. In the description below, when the word "over", "above", "up", "upward", or the like is used, it could have a meaning referring to the +Z direction, and, when the word "under", "below", "down", "downward", or the like is used, it could have a meaning referring to the −Z direction.

In FIGS. 1 to 5, the G-axis direction is the direction of a line normal to the ink ejecting surface 35 of the line head 34 described later. The +G direction, in which the arrow of the G axis is headed, is the direction in which a head unit 33 goes away from a transportation belt 7. The −G direction, which is the opposite thereof, is the direction in which the head unit 33 comes closer to the transportation belt 7.

The F-axis direction is the direction parallel to the ink ejecting surface 35. A medium is transported along the F-axis direction at the position where it faces the ink ejecting surface 35. The +F direction, in which the arrow of the F axis is headed, is the downstream direction in terms of transportation, and the −F direction, which is the opposite thereof, is the upstream direction in terms of transportation. In the description below, the direction in which a medium is transported may be referred to simply as "downstream". The opposite direction may be referred to simply as "upstream". The F-axis direction is the direction in which a cap carriage 31, which will be described later, moves.

Figure 4:
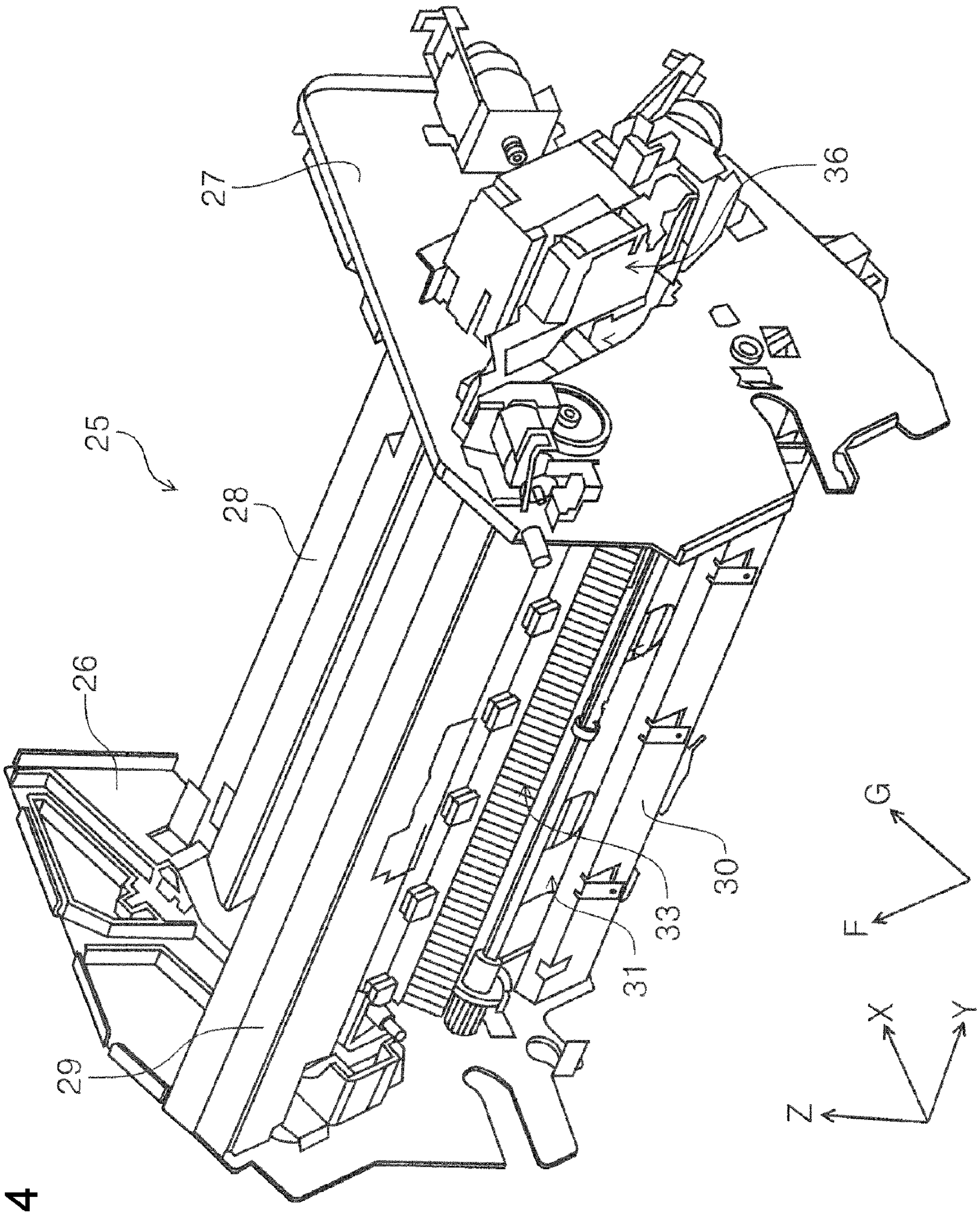
FIG. 4 is a perspective view of a motion unit.
Figure 5:
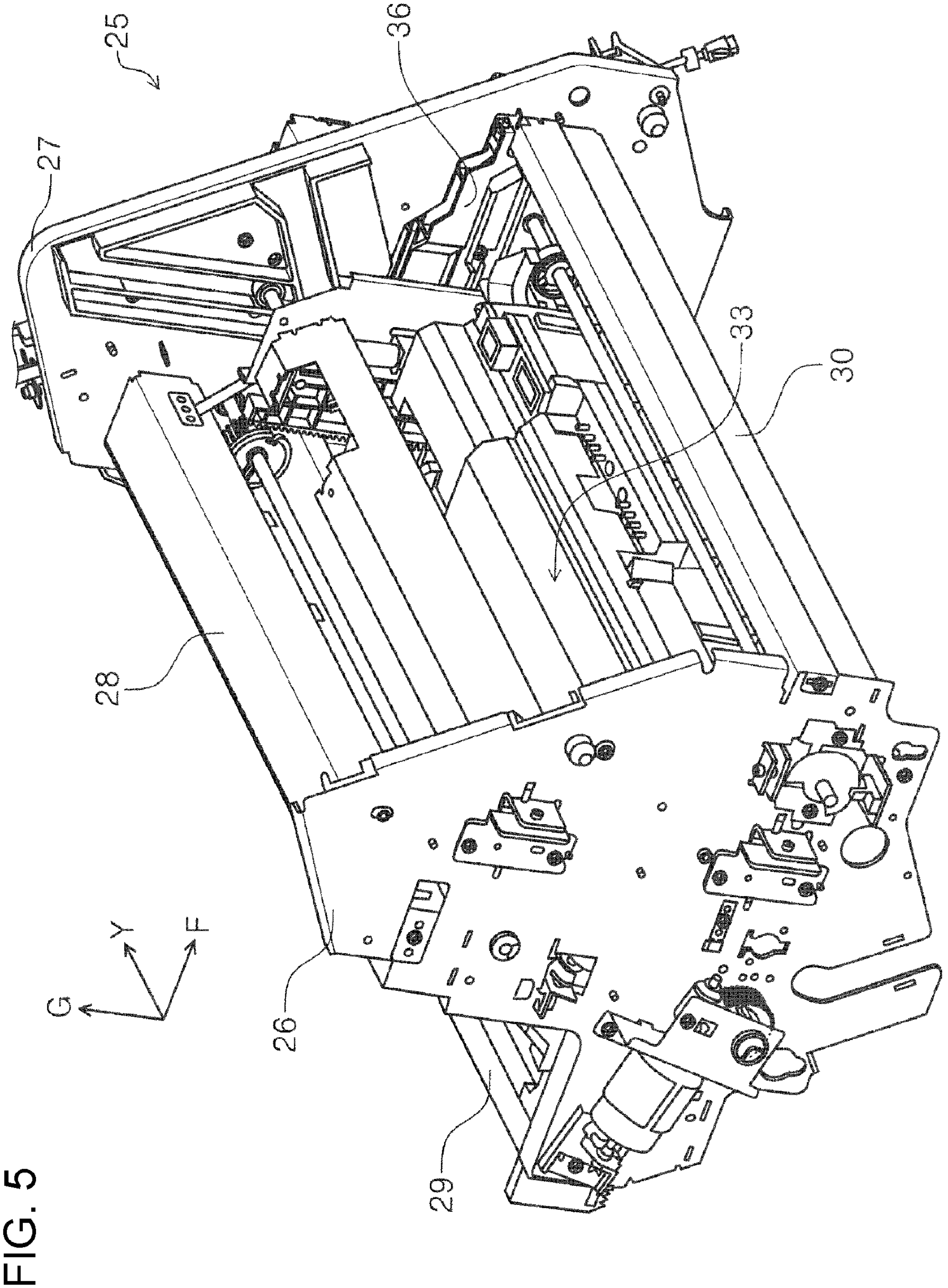
FIG. 5 is another perspective view of the motion unit.

In FIGS. 4 and 5, for the purpose of explanation, the F-G-Y coordinate system is used in place of the X-Y-Z coordinate system.

In FIG. 1, a medium transportation path is shown by broken-curve illustration. In the printer 1, a medium is transported along the medium transportation path shown by broken-curve illustration.

The printer 1 includes a feeding unit 1*a*, a recording unit 1*b*, and an ejecting unit 1*c*, which are disposed in this order as viewed from the bottom toward the top of the apparatus body 2. The feeding unit 1*a* includes components illustrated below a first junction line 61 of a rear frame 50, which will be described later, in FIG. 1. The recording unit 1*b* includes components illustrated above the first junction line 61 but below a second junction line 62 of the rear frame 50, which will be described later, in FIG. 1. The ejecting unit 1*c* includes components illustrated above the second junction line 62 in FIG. 1.

An ink containing portion 5, which will be described later, is a component of the recording unit 1*b*. An ejection tray 38 is a component of the ejecting unit 1*c*.

The medium transportation path will now be further explained. As medium cassettes each containing a medium before being fed, the apparatus body 2 includes the first medium cassette 3 and the second medium cassette 4. The second medium cassette 4 is located under the first medium cassette 3. The reference alphabet P denotes sheets of a medium contained in each of these medium cassettes.

The first medium cassette 3 and the second medium cassette 4 are provided in such a way as to be able to be slid in the Y-axis direction with respect to the apparatus body 2. In the description below, the first medium cassette 3 and the second medium cassette 4 will be collectively referred to as "each medium cassette" or "the respective medium cassettes" when no distinction is made therebetween.

For the first medium cassette 3, a pickup roller 9 for feeding out a sheet of the medium contained therein is provided. For the second medium cassette 4, a pickup roller 10 for feeding out a sheet of the medium contained therein is provided.

For the first medium cassette 3, a pair of feeding rollers 11 for feeding the picked-up medium obliquely upward is provided. For the second medium cassette 4, a pair of feeding rollers 12 for feeding the picked-up medium obliquely upward and a pair of transportation rollers 13 for transporting the fed medium vertically upward are provided.

The term "pair of rollers" used below means a pair that is made up of a driving roller and a driven roller, wherein the driving roller is driven by a motor that is not illustrated, and the driven roller is in contact with the driving roller and rotates as a slave by receiving a driving force for rotation from the driving roller when the driving roller rotates, unless otherwise described.

The medium fed out of each medium cassette is transported to a pair of transportation rollers 16 by a pair of transportation rollers 14 and a pair of transportation rollers 15. The medium that receives a transportation force from the pair of transportation rollers 16 is sent to a space between the line head 34, which is an example of a liquid ejecting head, and the transportation belt 7. In other words, the medium is sent to a position where the medium will face the line head 34. The line head 34 performs recording by ejecting ink onto the surface of the medium. The line head 34 is an ink ejecting head configured such that nozzles (not illustrated) for ejecting ink are arranged throughout the entire area in the medium width direction. The line head 34, as an ink ejecting head having such a structure, is capable of executing recording throughout the entire area in the medium width direction without any movement in the medium width direction.

The reference numeral 5 denotes an ink containing portion that contains ink inside. Ink that is to be ejected from the line head 34 is supplied from the ink containing portion 5 to the line head 34 through tubes that are not illustrated. The ink containing portion 5 is made up of a plurality of ink tanks arranged in the X-axis direction.

The transportation belt 7 is an endless belt wound around pulleys 8*a* and 8*b*. Either one of the pulleys 8*a* and 8*b* is, or both are, driven to rotate by a motor that is not illustrated. The transportation belt 7 turns due to this drive force. The medium is transported through a position where it faces the line head 34 while being held with adsorption on the belt surface of the transportation belt 7. Known methods such as an air vacuuming method, an electrostatic chuck method, and the like can be used for holding the medium with adsorption on the belt surface of the transportation belt 7.

The medium transportation path going through the position where the medium faces the line head 34 intersects with both the horizontal direction and the vertical direction and is configured to transport the medium obliquely upward. The direction in which the medium is transported obliquely upward includes both a −X-directional component and a +Z-directional component in FIG. 1. This structure makes it possible to reduce the size of the printer 1 in the horizontal direction.

In the present embodiment, the angle of inclination of the medium transportation path going through the position where the medium faces the line head 34 is set to be within a range from 50° to 70° with respect to the horizontal direction. More specifically, its angle of inclination is set to be 60° with respect to the horizontal direction.

The medium, after recording on its first side by the line head 34, is further transported obliquely upward by a pair of transportation rollers 17 located downstream of the transportation belt 7.

A flap 23 is provided downstream of the pair of transportation rollers 17. The direction in which the medium is transported is switched by the flap 23. If the medium is to be ejected without any switchback, the flap 23 switches the transportation path of the medium toward a pair of transportation rollers 20 located over the flap 23. Another flap 24 is provided downstream of the pair of transportation rollers 20. The flap 24 switches the transportation path of the medium either to a path for ejection from an ejection position A1 or to a path for transportation to a pair of transportation rollers 21 located over the flap 24. If the medium is transported to the pair of transportation rollers 21, the medium is ejected from an ejection position A2.

The medium ejected from the ejection position A1 is received by the ejection tray 38 inclined obliquely upward in a direction that includes a +X-directional component and a +Z-directional component. The medium ejected from the ejection position A2 is received by an option tray that is not illustrated.

If recording is to be performed on the second side of the medium in addition to the first side thereof, the flap 23 directs the medium obliquely upward in a direction that includes a −X-directional component and a +Z-directional component. In this case, the medium passes through a bifurcated position K1 to enter a switchback path located over the bifurcated position K1. A pair of transportation rollers 22 is provided on the switchback path. The medium having entered the switchback path is transported vertically upward by the pair of transportation rollers 22. Upon the passing of the trailing edge of the sheet of the medium through the bifurcated position K1, the direction of rotation of the pair of transportation rollers 22 is reversed. As a result of the reverse rotation, the medium is transported vertically downward.

The medium transported vertically downward by the pair of transportation rollers 22 receives a transportation force from the pair of transportation rollers 18, from the pair of transportation rollers 19, and next from the pair of transportation rollers 15 to arrive at the position of the pair of transportation rollers 16. Then, the medium is transported by the pair of transportation rollers 16 to the position where it faces the line head 34 again.

When the medium is transported to the position where it faces the line head 34 again, its second side, which is the opposite of its first side on which recording has already been performed, faces the line head 34. This makes it possible to perform recording on the second side of the medium by the line head 34. The medium, after recording on its second side, is ejected from the ejection position A1 or the ejection position A2 described above.

Next, a motion unit 25 will now be explained. The motion unit 25 illustrated in FIG. 3 includes the head unit 33 illustrated in FIG. 2, the cap carriage 31 illustrated in FIG. 2, and a wiper carriage 36.

The head unit 33 is a unit that includes the line head 34. The head unit 33 is able to be driven by a motor in the G-axis direction.

The cap carriage 31 is a unit that includes a cap 32 for covering the line head 34. The cap carriage 31 is able to be driven by a motor in the F-axis direction.

The wiper carriage 36 is a unit on which a wiper 37 for wiping the ink ejecting surface 35 of the line head 34 is provided. The wiper carriage 36 is able to be driven by a motor in the Y-axis direction.

As described above, the head unit 33, the cap carriage 31, and the wiper carriage 36 are provided such that they are able to be driven by the respective motors in the respective directions orthogonal to one another.

Figure 2:
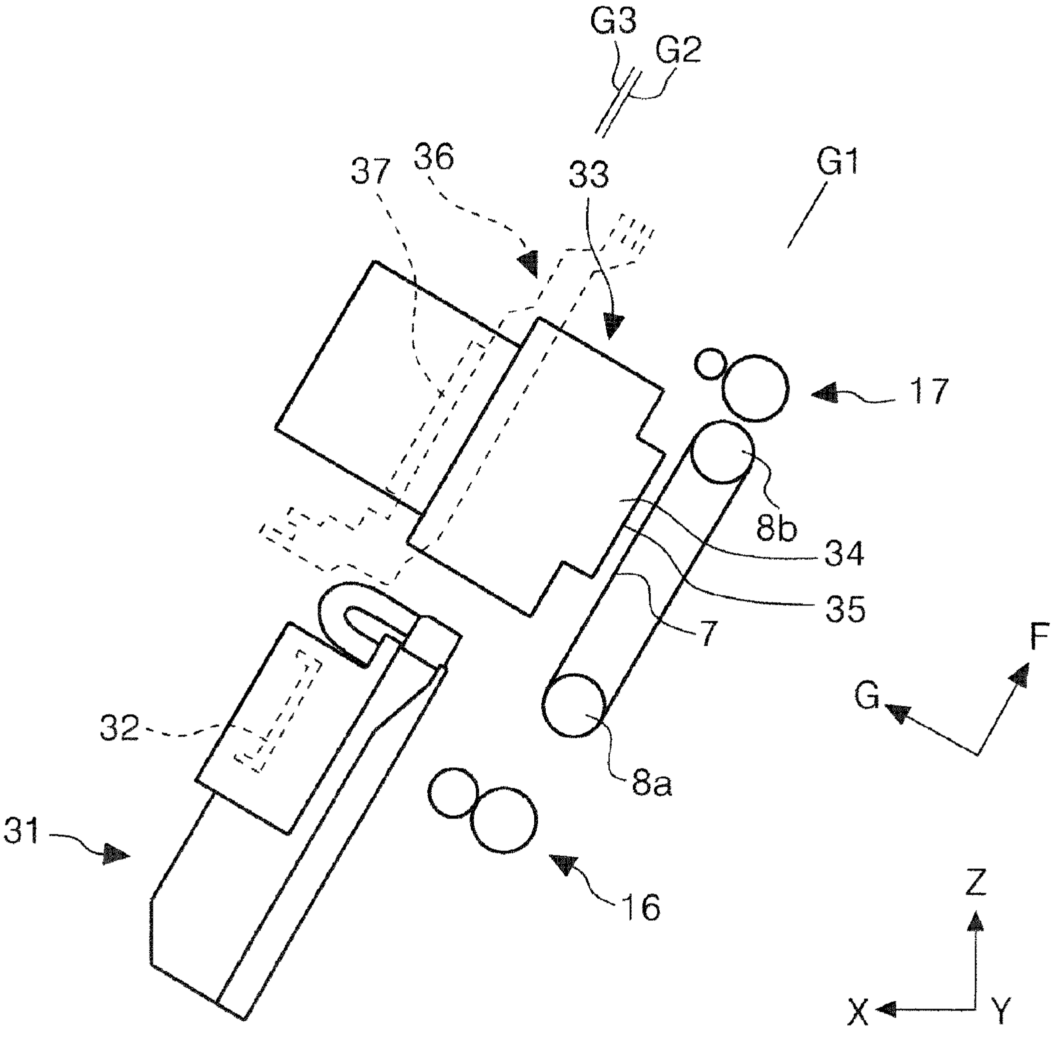
FIG. 2 is a diagram that illustrates a positional relationship among a head unit, a cap carriage, and a wiper carriage.

FIG. 2 illustrates the position of each unit when recording is performed on a medium by the line head 34. The position G1 is the position of the ink ejecting surface 35 in the G-axis direction in this state. In this state, the cap carriage 31 is located at a position away from the head unit 33 in the −F direction, and the wiper carriage 36 is located at its home position set in the +Y direction. FIGS. 4 and 5 illustrate a state in which the wiper carriage 36 is located at the home position.

To put the cap 32 of the cap carriage 31 onto the ink ejecting surface 35 from this state, the head unit 33 moves in the +G direction from the position illustrated in FIG. 2, and the cap carriage 31 moves in the +F direction. As a result of this movement, the ink ejecting surface 35 and the cap 32 face each other. The position G2 is the position of the ink ejecting surface 35 in the G-axis direction when the cap 32 is put on the ink ejecting surface 35.

To enable the ink ejecting surface 35 to be wiped with the wiper 37 of the wiper carriage 36, the head unit 33 moves in the +G direction from the position illustrated in FIG. 2. Then, the wiper carriage 36 moves from the +Y-directional home position to the −Y-side end position. After this movement, the head unit 33 moves slightly in the −G direction, and the wiper carriage 36 moves in the +Y direction in a state in which the ink ejecting surface 35 is located at the position G3, thereby wiping the ink ejecting surface 35 with the wiper 37.

As illustrated in FIGS. 4 and 5, the motion unit 25 includes a first side frame 26 and a second side frame 27, which is located at the +Y-directional opposite position with respect to the first side frame 26. Each of the first side frame 26 and the second side frame 27 is made of a metal plate material and forms a frame plane that is along the F-G plane.

The first side frame 26 and the second side frame 27 are connected to each other by a first connection frame 28, a second connection frame 29, and a third connection frame 30, each of which extends in the Y-axis direction. Each of the first connection frame 28, the second connection frame 29, and the third connection frame 30 is formed by bending a metal plate material.

In the present embodiment, the first connection frame 28, the second connection frame 29, and the third connection frame 30 are joined to the first side frame 26 and the second side frame 27 by welding.

Each of the first connection frame 28, the second connection frame 29, and the third connection frame 30 is formed by bending such that a part or a whole of its cross-sectional shape will be quadrangular when cut along the F-G plane virtually. This structure enhances the rigidity of the motion unit 25 as a whole.

Figure 3:
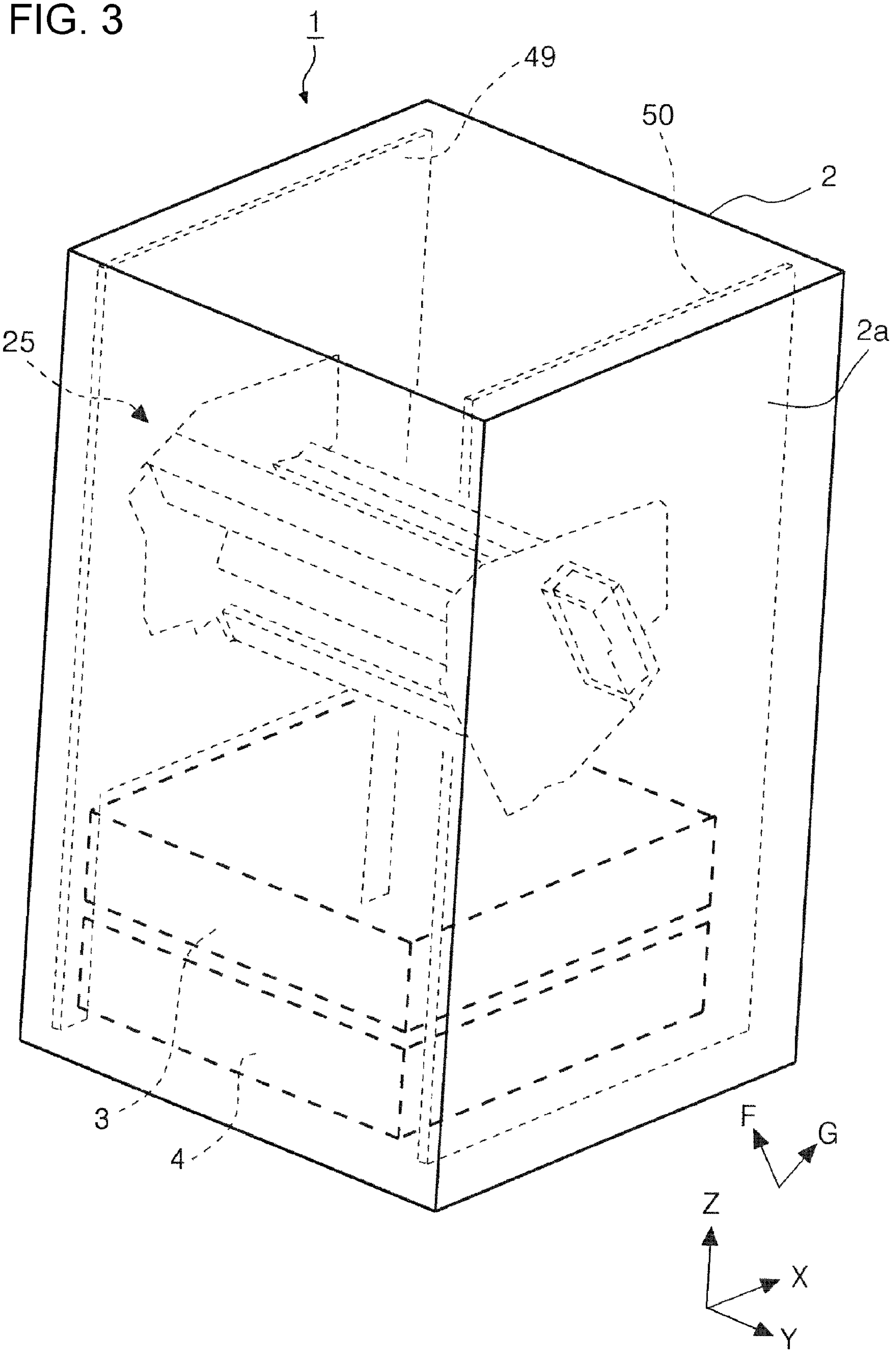
FIG. 3 is a rear perspective view of the printer.

As illustrated in FIG. 3, the apparatus body 2 has a front frame 49 at its −Y-directional end and the rear frame 50 serving as a base frame at its +Y-directional end. The front frame 49 and the rear frame 50 constitute the framework of the apparatus. Each of the front frame 49 and the rear frame 50 is made of a metal material. The motion unit 25 is fixed to the front frame 49 and the rear frame 50. The body of the printer 1 is formed by fixing the motion unit 25 to the front frame 49 and the rear frame 50.

A unit assembly configured by fixing the motion unit 25 to the front frame 49 and the rear frame 50 is enclosed by a housing made of a resin material, although a detailed explanation thereof is omitted here. The reference numeral 2*a* denotes a rear lateral face among the sides of the apparatus body 2. The rear frame 50 forms a frame plane that is parallel to the side 2*a*. The side 2*a* is parallel to the X-Z plane. The side 2*a* may be a front lateral face among the sides of the apparatus body 2.

In the present embodiment, screw fastening is used for fixing the motion unit 25 to the front frame 49 and the rear frame 50. However, welding may be used instead.

Figure 6:
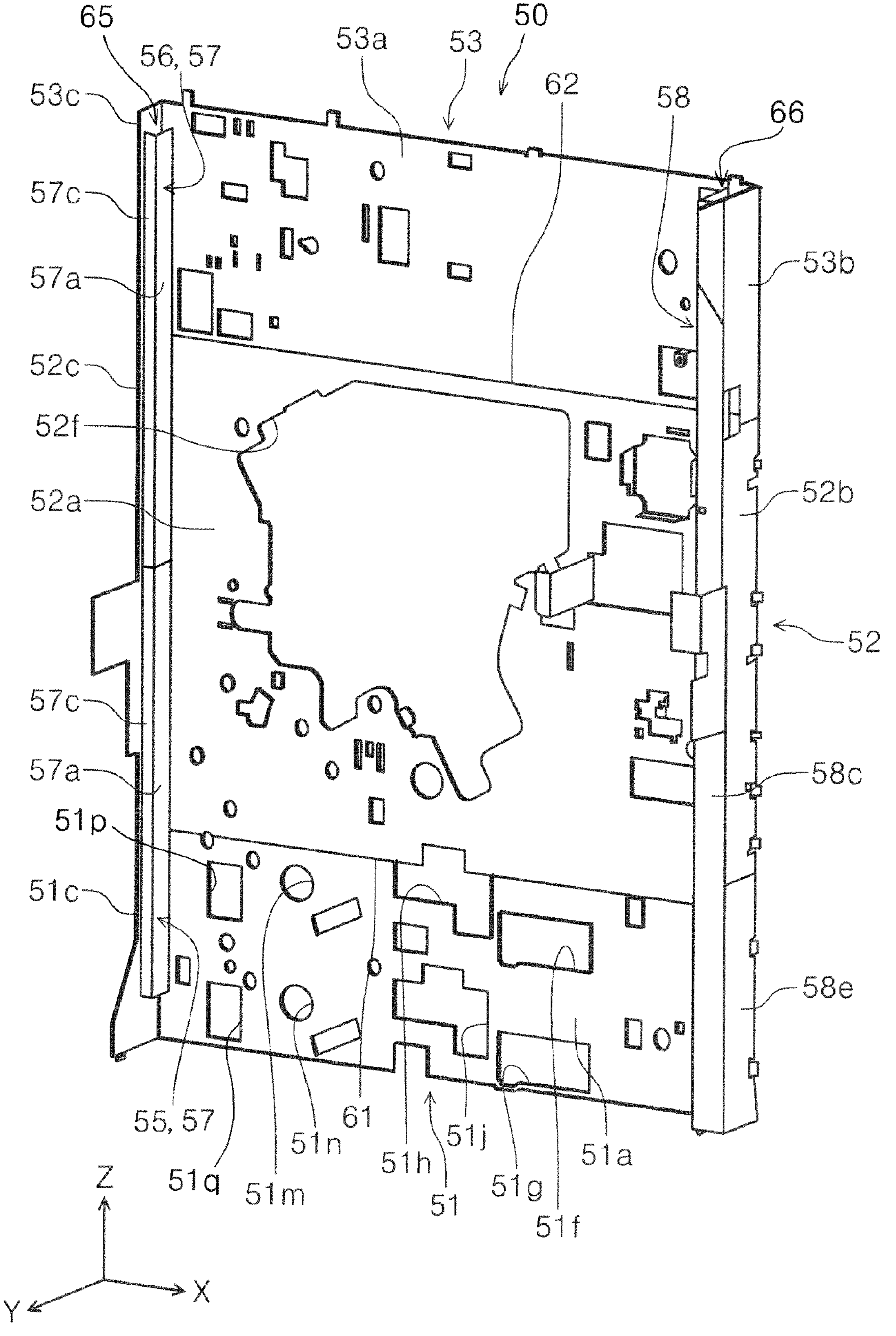
FIG. 6 is a rear perspective view of a rear frame.
Figure 7:
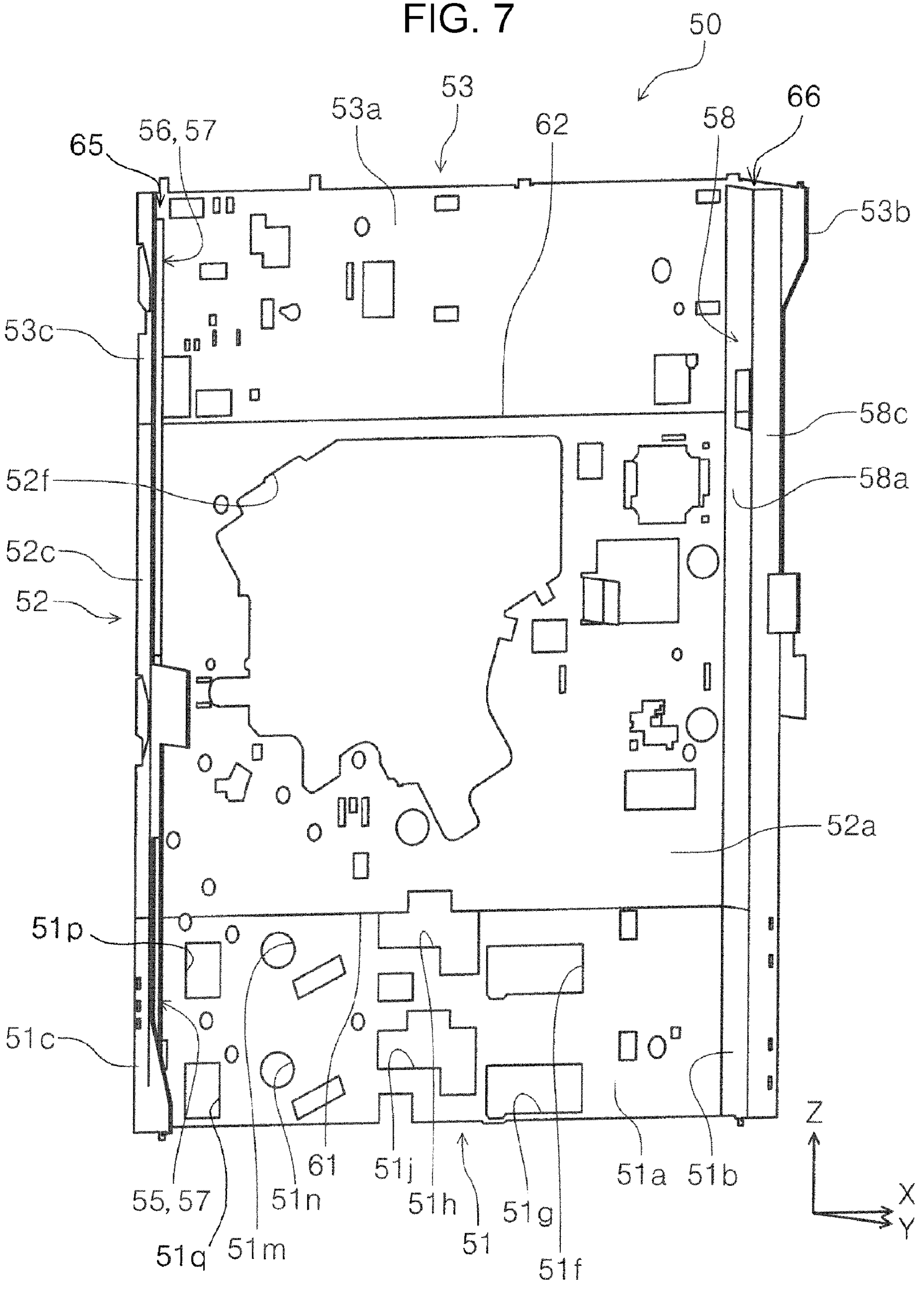
FIG. 7 is another rear perspective view of the rear frame.

With reference to FIG. 6 and some subsequent drawings, the rear frame 50 having a characteristic structure according to the present embodiment will now be further explained.

The rear frame 50 includes a first metal sheet 51, which is disposed at the lowest position, a second metal sheet 52, which is disposed over the first metal sheet 51, and a third metal sheet 53, which is disposed over the second metal sheet 52.

A third reinforcement member 58 is provided at the +X-directional end of the rear frame 50. A first reinforcement member 55 and a second reinforcement member 56 are provided at the −X-directional end of the rear frame 50. Because of this structure, a first support column portion 66 extending in the Z-axis direction is formed at the +X-directional end of the rear frame 50, and a second support column portion 65 extending in the Z-axis direction is formed at the −X-directional end of the rear frame 50.

In the present embodiment, all of the first metal sheet 51, the second metal sheet 52, the third metal sheet 53, the first reinforcement member 55, the second reinforcement member 56, and the third reinforcement member 58 are made of the same metal plate material having an equal plate thickness and are formed by press working.

The +X-directional end portion of the first metal sheet 51 is bent in the +Y direction to form a side frame portion 51*b* from a main frame portion 51*a* forming a frame plane parallel to the X-Z plane. The −X-directional end portion of the first metal sheet 51 is bent in the +Y direction to form a side frame portion 51*c* from the main frame portion 51*a*.

The +X-directional end portion of the second metal sheet 52 is bent in the +Y direction to form a side frame portion 52*b* from a main frame portion 52*a* forming a frame plane parallel to the X-Z plane. The −X-directional end portion of the second metal sheet 52 is bent in the +Y direction to form a side frame portion 52*c* from the main frame portion 52*a*.

The +X-directional end portion of the third metal sheet 53 is bent in the +Y direction to form a side frame portion 53*b* from a main frame portion 53*a* forming a frame plane parallel to the X-Z plane. The −X-directional end portion of the third metal sheet 53 is bent in the +Y direction to form a side frame portion 53*c* from the main frame portion 53*a*.

Many openings for mounting the components of the printer 1 are formed in the first metal sheet 51, the second metal sheet 52, and the third metal sheet 53. Among these openings, the motion unit 25 described above is mounted into an opening 52*f*, the largest one formed in the second metal sheet 52. Not all of these openings will be described below. Reference numerals for those not described below are omitted.

Figure 19:
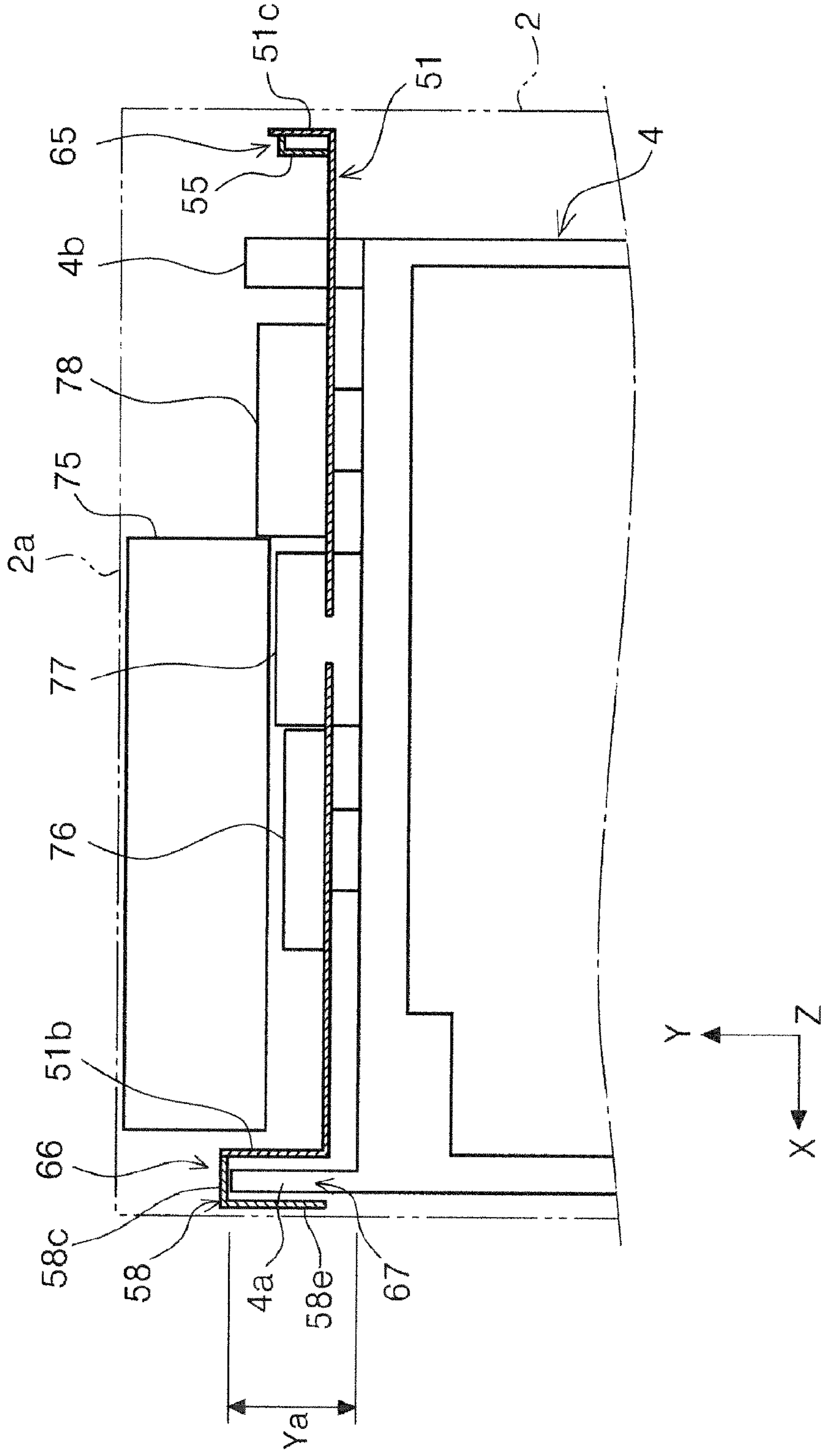
FIG. 19 is a cross-sectional view taken along the X-Y plane in FIG. 16 of the body of the apparatus.
Figure 20A:
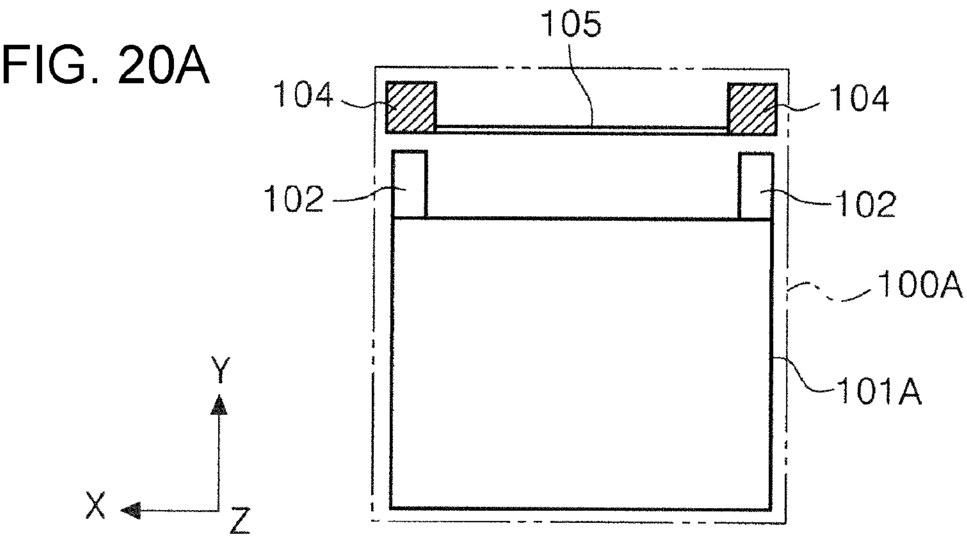
FIG. 20A is a schematic view of an example of a frame and a cassette for explaining a problem of related art.
Figure 20B:
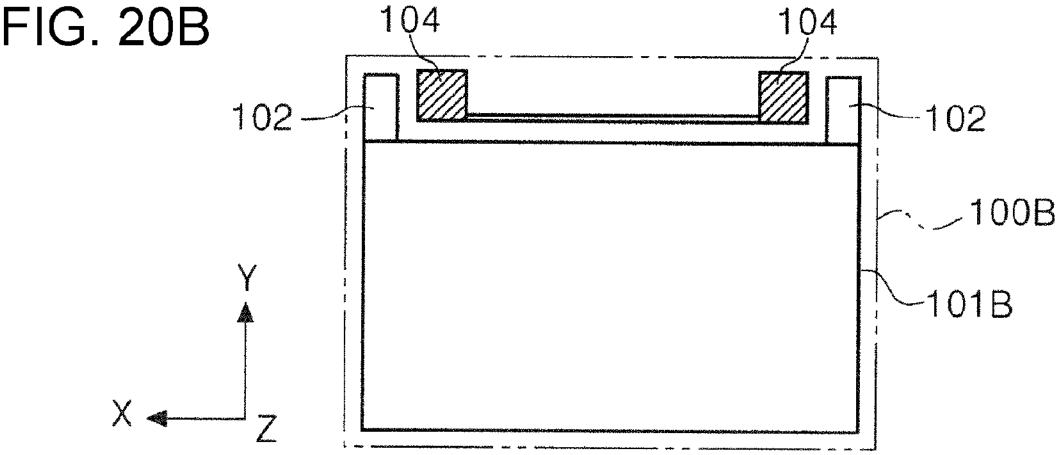
FIG. 20B is a schematic view of another example of a frame and a cassette for explaining a problem of related art.
Figure 20C:
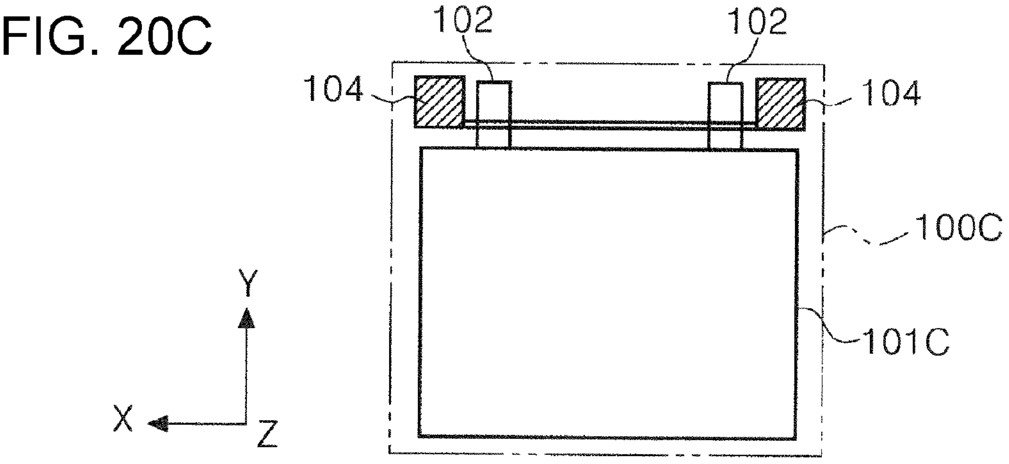
FIG. 20C is a schematic view of still another example of a frame and a cassette for explaining a problem of related art.

The openings 51*h* and 51*j* of the first metal sheet 51 are openings for the mounting of a movement control unit 77 (see FIG. 19). The movement control unit 77 has a function of, when the medium cassette is inserted into the apparatus body 2 to be mounted into its attachment position, mitigating a shock and pulling the medium cassette into the attachment position.

Figure 17:
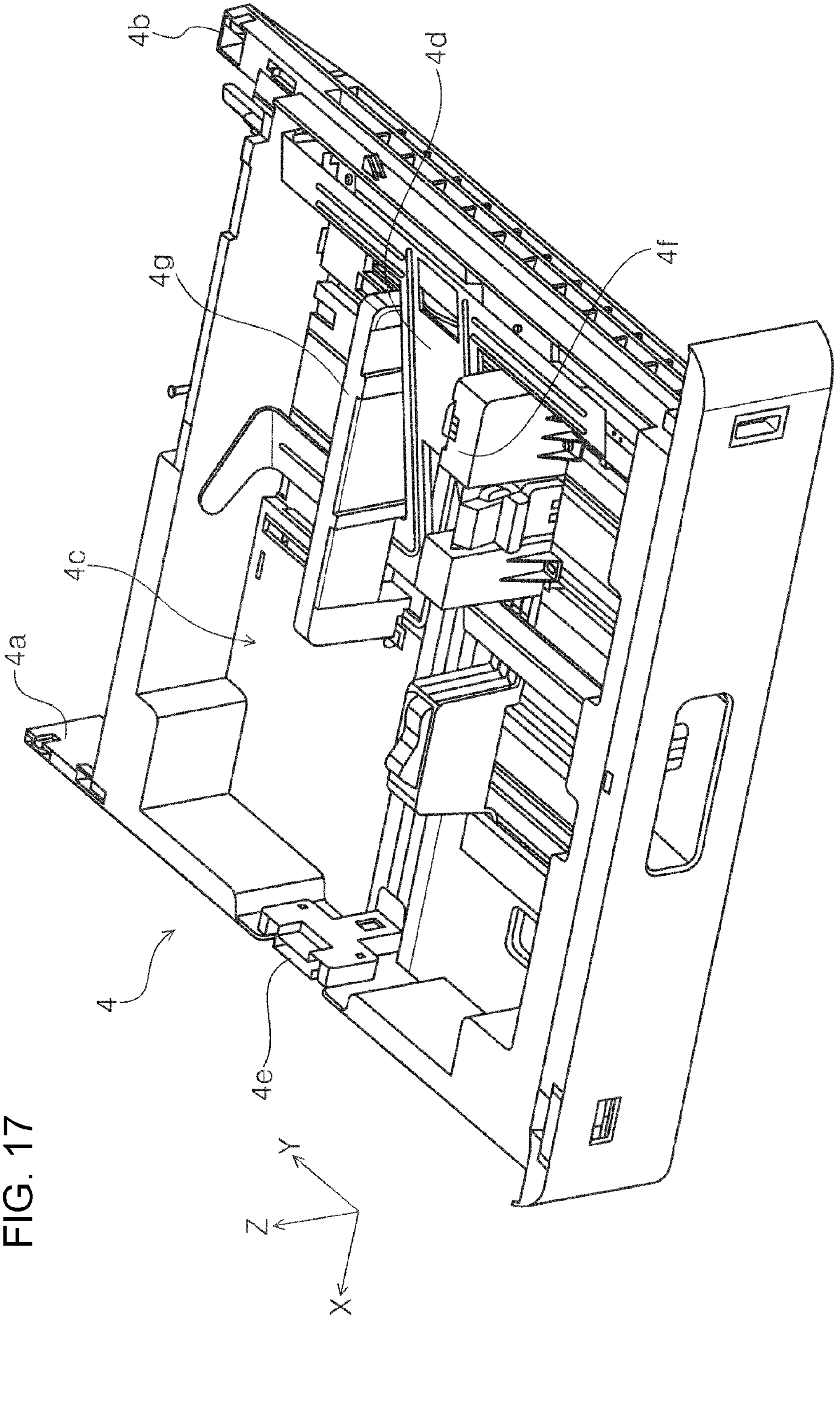
FIG. 17 is a top perspective view of the second medium cassette.
Figure 18:
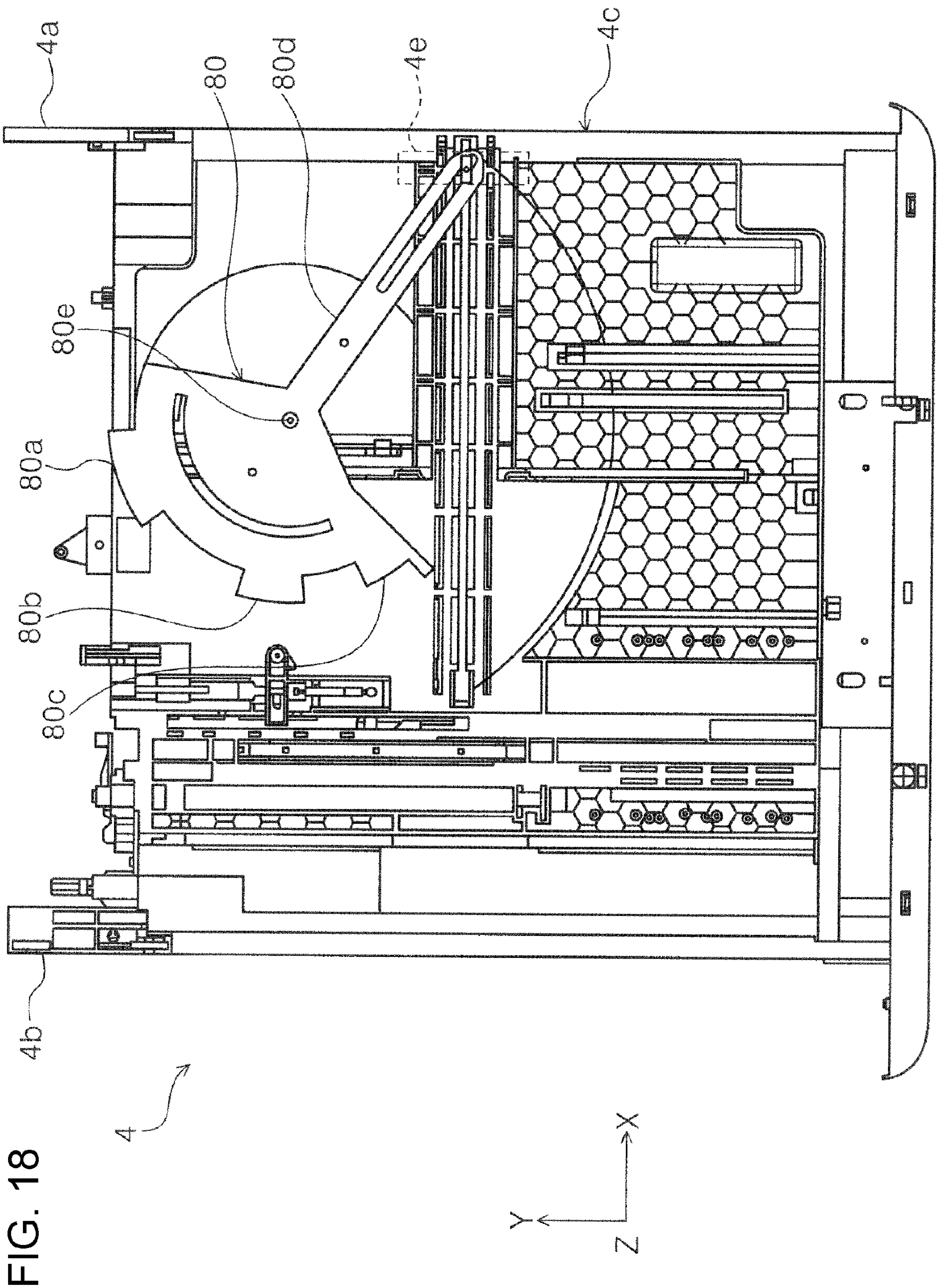
FIG. 18 is a bottom plan view of the second medium cassette.

The openings 51*f* and 51*g* are openings for the mounting of a size detection unit 76 (see FIG. 19) configured to detect the size of a medium contained in each medium cassette. Detection targets, which are to be detected by the size detection unit 76, are provided on each medium cassette. With reference to FIGS. 17 and 18, a brief explanation of the structure of each medium cassette is given below. In FIGS. 17 and 18, the second medium cassette 4 is illustrated as a representative example. However, the structure of the first medium cassette 3 is the same as that of the illustrated counterpart.

As illustrated in FIG. 17, the second medium cassette 4 has a first protruding portion 4*a* and a second protruding portion 4*b*, each of which protrudes in the +Y direction, at respective +Y-directional ends of a cassette body 4*c*. Specifically, the first protruding portion 4*a* is provided on the +X-directional end of the cassette body 4*c* in the X-axis direction, and the second protruding portion 4*b* is provided on the −X-directional end thereof. In the description below, a first protruding portion (not illustrated) formed on the first medium cassette 3 and the first protruding portion 4*a* formed on the second medium cassette 4 may be representatively referred to as "first protruding portion" without being followed by any reference numeral. Similarly, a second protruding portion (not illustrated) formed on the first medium cassette 3 and the second protruding portion 4*b* formed on the second medium cassette 4 may be representatively referred to as "second protruding portion" without being followed by any reference numeral.

A bottom plate 4*d* for lifting up sheets of a medium contained is provided inside the cassette body 4*c*. A trailing edge guide 4*e* for guiding the +X-directional edge of the sheets of the medium contained, namely, the trailing edge thereof, is provided inside the cassette body 4*c* such that it is movable in the X-axis direction. In addition, a side edge guide 4*g* for guiding the +Y-directional edge of the sheets of the medium contained, and a side edge guide 4*f* for guiding the −Y-directional edge of the sheets of the medium contained, are provided inside the cassette body 4*c* such that they are movable in the Y-axis direction.

A rotary plate 80 is provided on the back of the cassette body 4*c* as illustrated in FIG. 18 in such a way as to be able to rotate on its rotation axis 80*e*. The rotary plate 80 has a link arm 80*d*. The link arm 80*d* is in engagement with the trailing edge guide 4*e*. Linked with the slide movement of the trailing edge guide 4*e* in the X-axis direction, the rotary plate 80 rotates due to this engagement.

Detection targets 80*a*, 80*b*, and 80*c* are provided on the rotary plate 80 along its circumferential direction of rotation. Each of the detection targets 80*a*, 80*b*, and 80*c* is a portion that is to be detected by the size detection unit 76 (see FIG. 19) described above. The lengths of the detection targets 80*a*, 80*b*, and 80*c* in the circumferential direction are different from one another. Based on the different arc sizes, the size detection unit 76 (see FIG. 19) distinguishes the detection targets 80*a*, 80*b*, and 80*c* from one another, thereby detecting the position of the trailing edge guide 4*e* in the X-axis direction, namely, the size of the medium contained inside.

With reference back to FIGS. 6 to 9, the openings 51*m* and 51*n* are openings for the mounting of a bottom plate driving unit 78 (see FIG. 19) configured to elevate the bottom plate of each medium cassette.

In FIGS. 6 to 9, the reference numeral 61 denotes a first junction line that is the line of joining the first metal sheet 51 and the second metal sheet 52 together, and the reference numeral 62 denotes a second junction line that is the line of joining the second metal sheet 52 and the third metal sheet 53 together. In the present embodiment, the metal sheets have a substantially equal thickness and, therefore, there is almost no step at the first junction line 61 and the second junction line 62, meaning that a flat frame plane is formed.

In the present embodiment, the metal sheets and the reinforcement members are joined together by welding.

Figure 10:
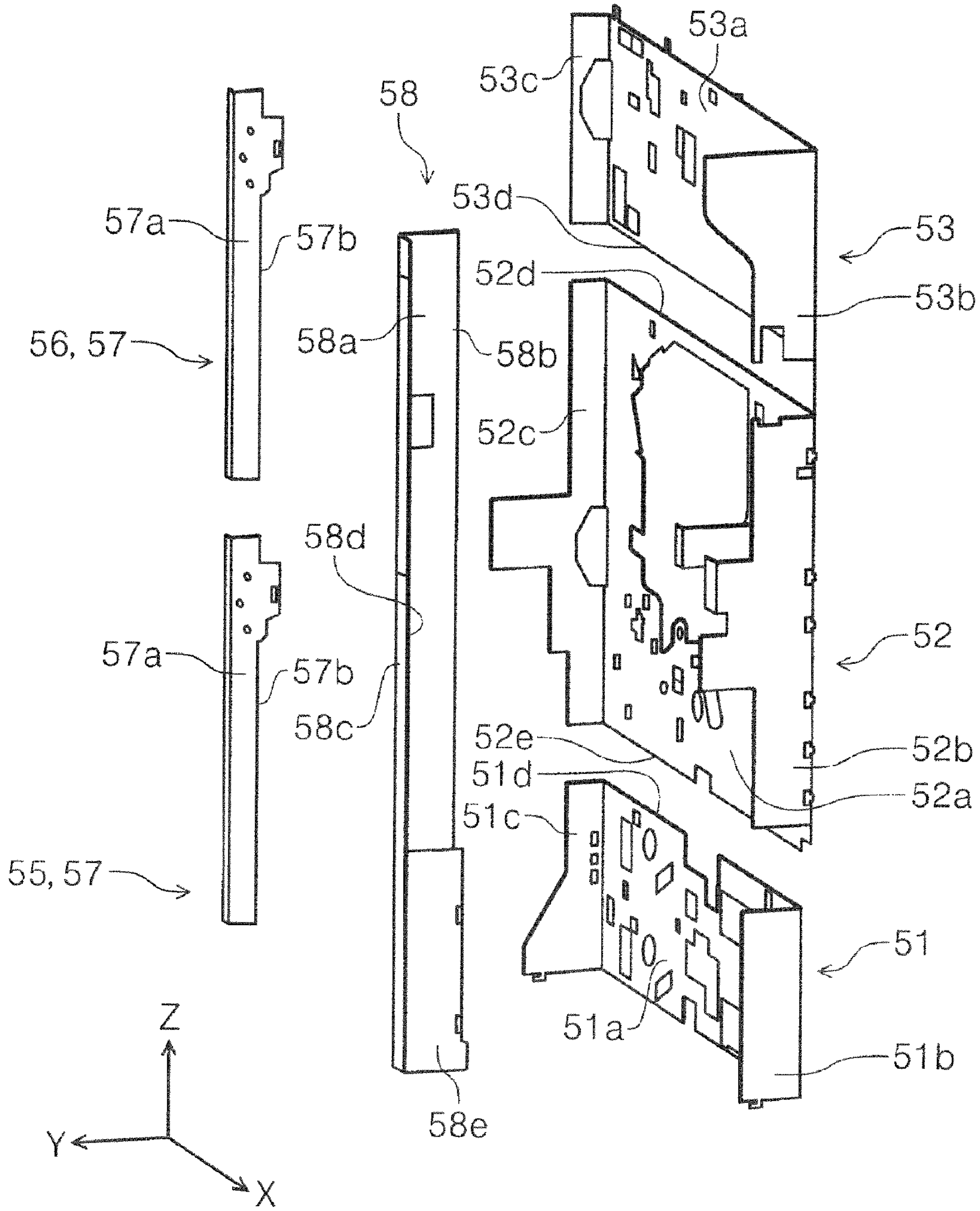
FIG. 10 is an exploded perspective view of the rear frame.
Figure 14:
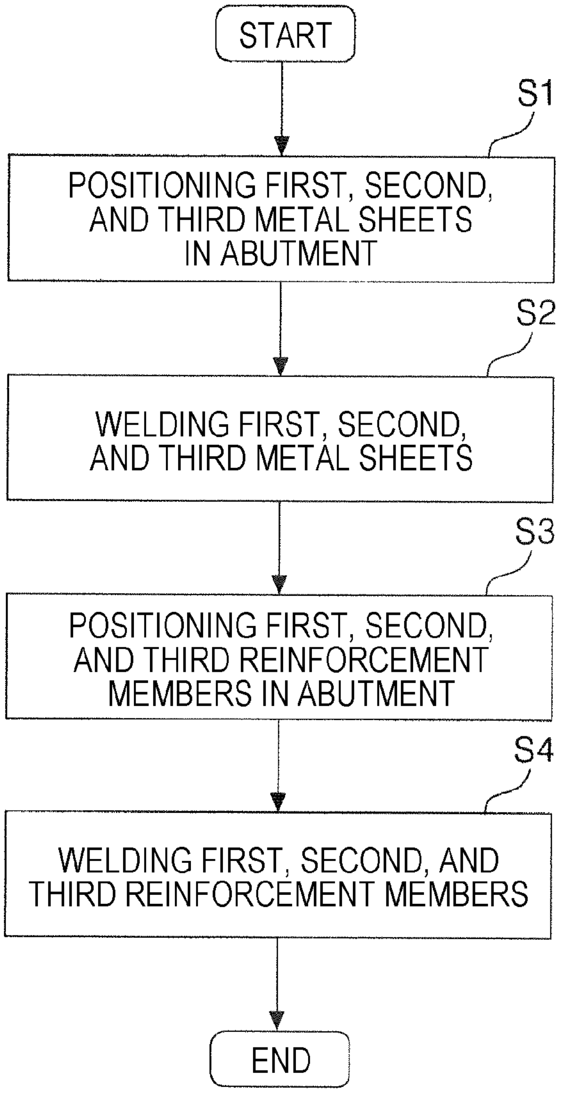
FIG. 14 is a flowchart that illustrates the steps of manufacturing the rear frame.

The rear frame 50 is manufactured through the following processes. First, as illustrated in FIG. 14, the first metal sheet 51 and the second metal sheet 52 are positioned in abutment with each other, and the second metal sheet 52 and the third metal sheet 53 are positioned in abutment with each other (step S1). More specifically, the upper edge 51*d* of the first metal sheet 51 illustrated in FIG. 10 and the lower edge 52*e* of the second metal sheet 52 illustrated therein are positioned in abutment with each other to make the gap between the first metal sheet 51 and the second metal sheet 52 zero. In addition, the upper edge 52*d* of the second metal sheet 52 and the lower edge 53*d* of the third metal sheet 53 are positioned in abutment with each other to make the gap between the second metal sheet 52 and the third metal sheet 53 zero.

In this state, the gap between the side frame portion 51*c* of the first metal sheet 51 and the side frame portion 52*c* of the second metal sheet 52 is also zero.

Moreover, the gap between the side frame portion 52*b* of the second metal sheet 52 and the side frame portion 53*b* of the third metal sheet 53 is zero, and the gap between the side frame portion 52*c* of the second metal sheet 52 and the side frame portion 53*c* of the third metal sheet 53 is also zero.

Next, the first metal sheet 51 and the second metal sheet 52 are welded together, and the second metal sheet 52 and the third metal sheet 53 are welded together (step S2 in FIG. 14). In the present embodiment, this welding is performed as spot welding along the first junction line 61 and the second junction line 62 at a pitch of a few centimeters or so. The region of abutment of the side frame portion 51*c* of the first metal sheet 51 and the side frame portion 52*c* of the second metal sheet 52 is welded at, by spot welding, at least one position.

The region of abutment of the side frame portion 52*b* of the second metal sheet 52 and the side frame portion 53*b* of the third metal sheet 53 is welded at, by spot welding, at least one position. The region of abutment of the side frame portion 52*c* of the second metal sheet 52 and the side frame portion 53*c* of the third metal sheet 53 is also welded at, by spot welding, at least one position.

Figure 11:
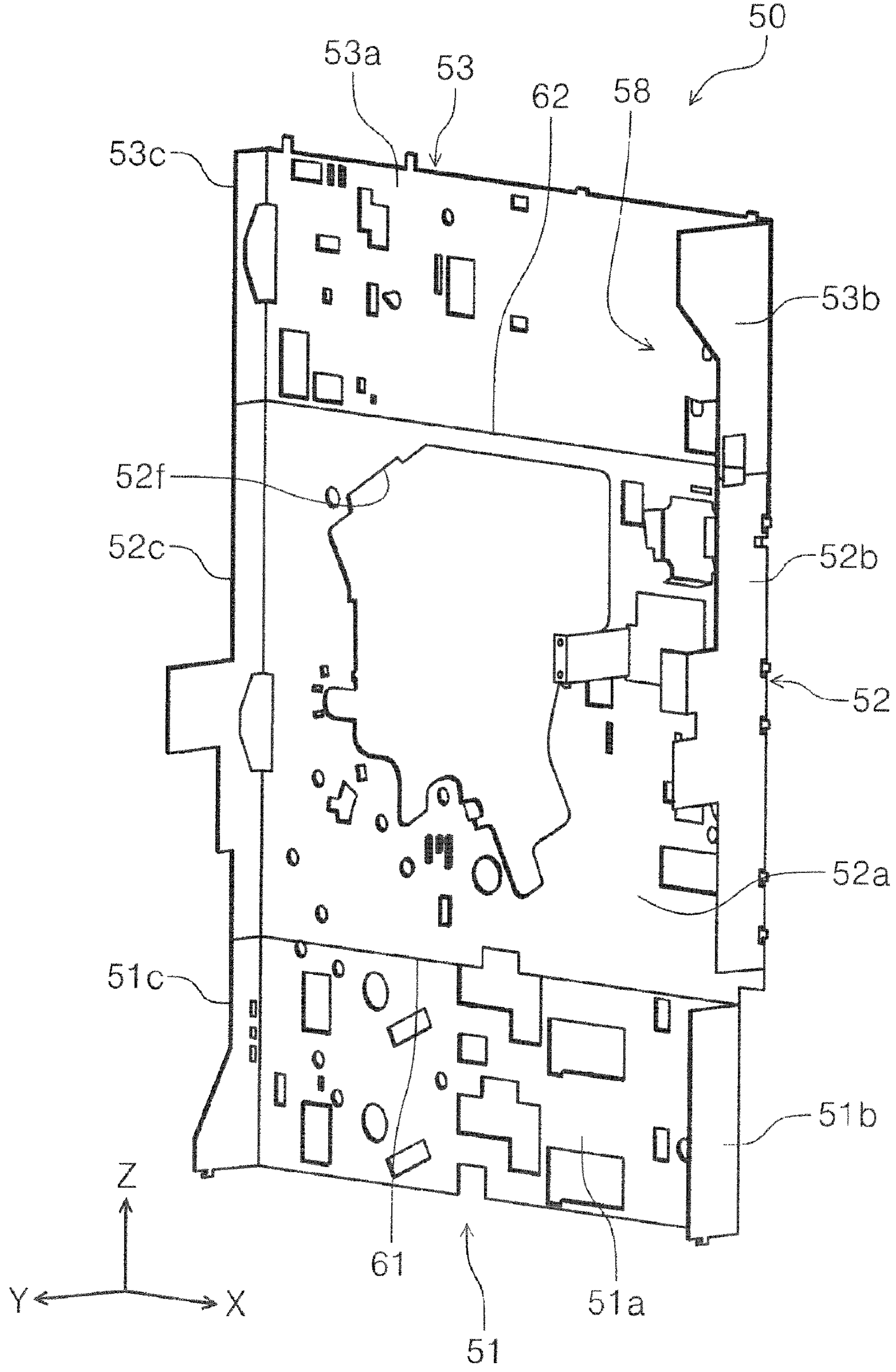
FIG. 11 is another rear perspective view of the rear frame.

Through the above processes, the first metal sheet 51, the second metal sheet 52, and the third metal sheet 53 are joined together as illustrated in FIG. 11. The rear frame 50 made up of them joined together can be obtained in this way.

Next, the first reinforcement member 55, the second reinforcement member 56, and the third reinforcement member 58 are positioned in abutment with the rear frame 50 (step S3 in FIG. 14), followed by joining by welding (step S4 in FIG. 14). The steps S1 and S3 may be performed simultaneously. That is, the first metal sheet 51, the second metal sheet 52, the third metal sheet 53, the first reinforcement member 55, the second reinforcement member 56, and the third reinforcement member 58 may be positioned in abutment, and, in this state, spot welding may be performed sequentially.

Each reinforcement member will now be further explained.

In the present embodiment, the same type of member is used for the first reinforcement member 55 and the second reinforcement member 56. The "same type of member" means that the two members are equal in shape, size, and material. Needless to say, the meaning of "equal in shape, size" should not be limited to perfect equality. Minor differences caused by manufacturing errors are tolerated.

Figure 13:
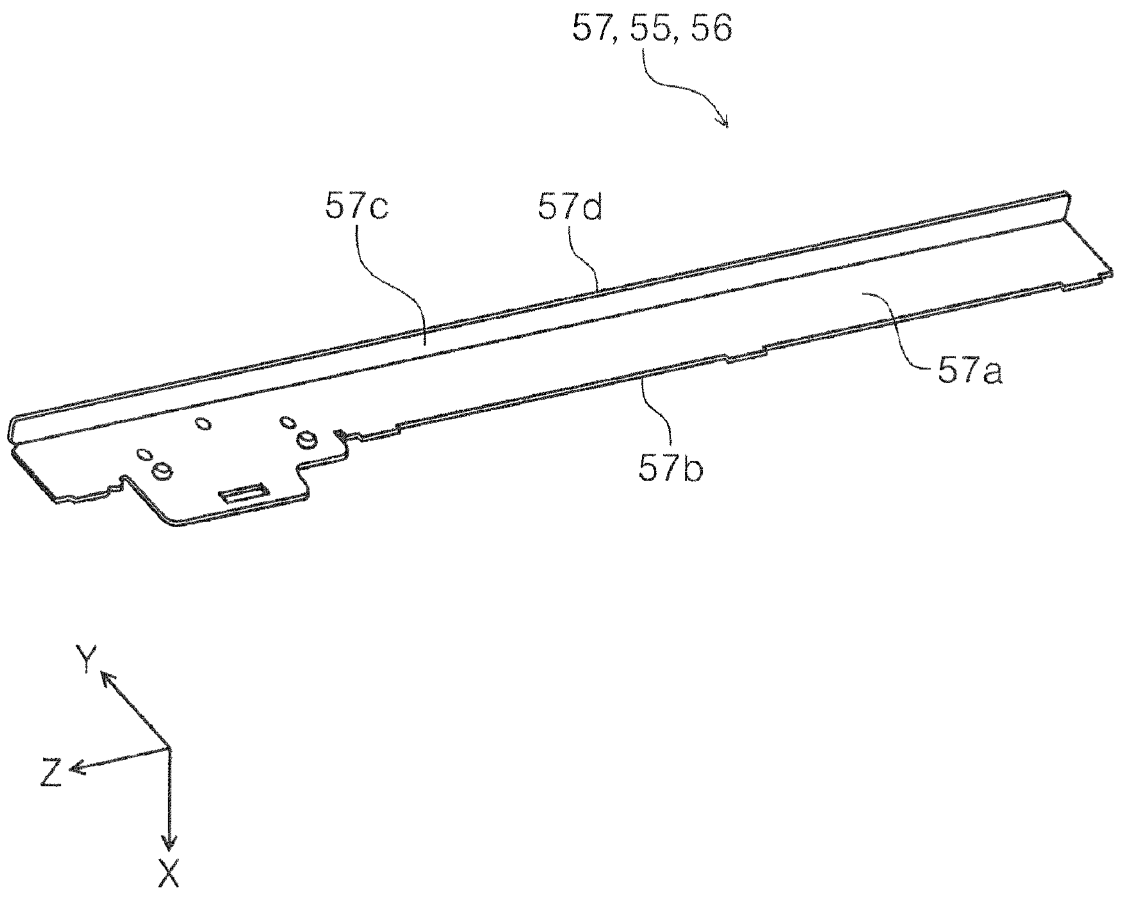
FIG. 13 is a perspective view of a common reinforcement member used as a first reinforcement member and a second reinforcement member.

A common reinforcement member 57, which is used as the first reinforcement member 55 and the second reinforcement member 56, is illustrated in FIG. 13. The common reinforcement member 57 has a first frame portion 57*a* forming a plane parallel to the Y-Z plane and a second frame portion 57*c* forming a plane parallel to the X-Z plane.

The common reinforcement member 57 used as the first reinforcement member 55 is disposed in such a way as to extend across the boundary/junction between the first metal sheet 51 and the second metal sheet 52. A first frame edge 57*b*, which is the −Y-directional edge of the first frame portion 57*a*, is joined by spot welding to the main frame portion 51*a* of the first metal sheet 51 and the main frame portion 52*a* of the second metal sheet 52.

A second frame edge 57*d*, which is the −X-directional edge of the second frame portion 57*c*, is joined by spot welding to the side frame portion 51*c* of the first metal sheet 51 and the side frame portion 52*c* of the second metal sheet 52.

The common reinforcement member 57 used as the second reinforcement member 56 is disposed in such a way as to extend across the boundary/junction between the second metal sheet 52 and the third metal sheet 53. The first frame edge 57*b*, which is the −Y-directional edge of the first frame portion 57*a*, is joined by spot welding to the main frame portion 52*a* of the second metal sheet 52 and the main frame portion 53*a* of the third metal sheet 53.

The second frame edge 57*d*, which is the −X-directional edge of the second frame portion 57*c*, is joined by spot welding to the side frame portion 52*c* of the second metal sheet 52 and the side frame portion 53*c* of the third metal sheet 53.

In the present embodiment, the +Z-directional end of the first reinforcement member 55 and the −Z-directional end of the second reinforcement member 56 are also welded to join the first reinforcement member 55 and the second reinforcement member 56 together.

The second support column portion 65 made up of the above components and extending in the Z-axis direction is formed at the −X-directional end of the rear frame 50. The second support column portion 65 is formed as a hollow support column having a quadrangular shape when viewed in the Z-axis direction as illustrated in FIG. 19. The −X-directional sidewall of the second support column portion 65, as a part of the second support column portion 65, is constituted of the side frame portion 51*c*, the side frame portion 52*c*, and the side frame portion 53*c*, which are formed by bending the −X-directional end portion of the rear frame 50. The −Y-directional sidewall of the second support column portion 65, as a part of the second support column portion 65, is constituted of the main frame portion 51*a*, the main frame portion 52*a*, and the main frame portion 53*a*. The +X-directional sidewall of the second support column portion 65, as a part of the second support column portion 65, is constituted of the first frame portion 57*a* of the first reinforcement member 55 and the first frame portion 57*a* of the second reinforcement member 56. The +Y-directional sidewall of the second support column portion 65, as a part of the second support column portion 65, is constituted of the second frame portion 57*c* of the first reinforcement member 55 and the second frame portion 57*c* of the second reinforcement member 56.

Figure 12:
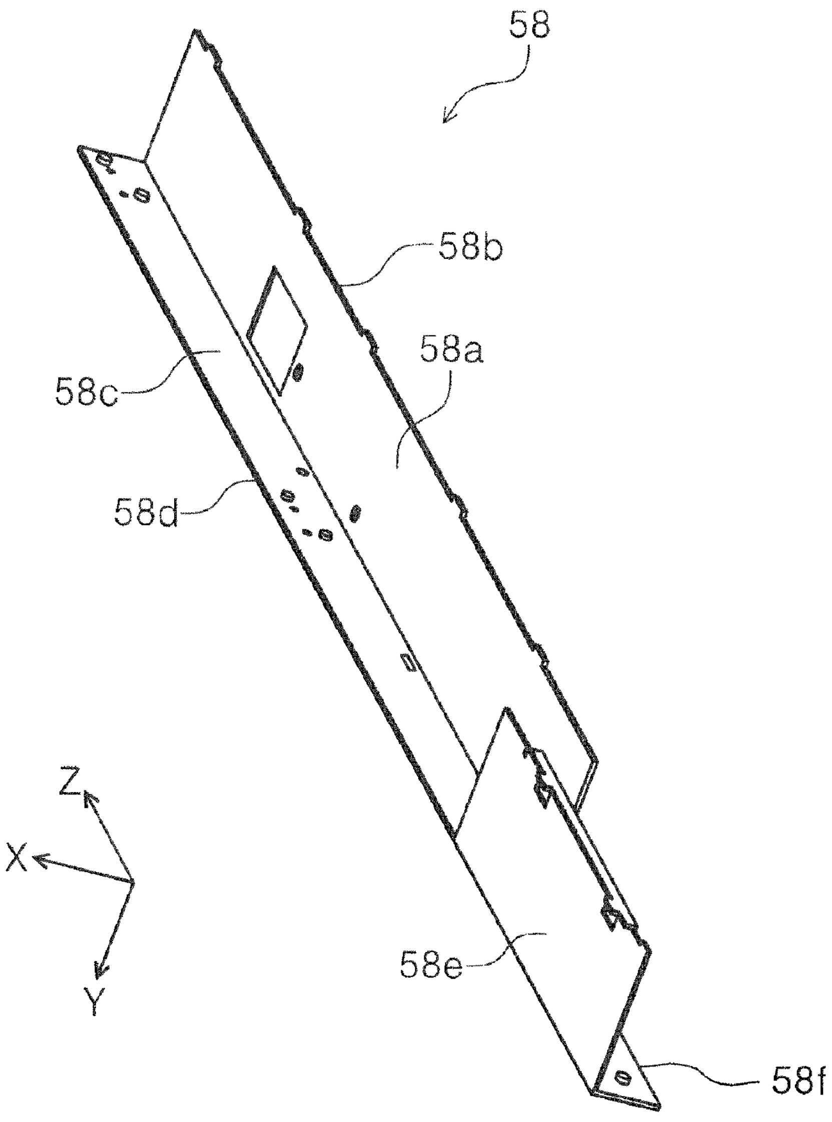
FIG. 12 is a perspective view of a third reinforcement member.

Next, the third reinforcement member 58 will now be explained. As illustrated in FIG. 12, the third reinforcement member 58 has a first frame portion 58*a* forming a plane parallel to the Y-Z plane, a third frame portion 58*e* forming a plane parallel to the Y-Z plane, and a second frame portion 58*c* forming a plane parallel to the X-Z plane. The third frame portion 58*e* is located at a −Z-directional position with respect to the first frame portion 58*a*. The second frame portion 58*c* is located between the first frame portion 58*a* and the third frame portion 58*e* in the X-axis direction.

The third reinforcement member 58 has a first frame edge 58*b*, which is the −Y-directional edge of the first frame portion 58*a*. The first frame edge 58*b* is joined by spot welding to the main frame portion 52*a* of the second metal sheet 52 and the main frame portion 53*a* of the third metal sheet 53. A second frame edge 58*d*, which is the +X-directional edge of the second frame portion 58*c*, is joined by spot welding to the side frame portion 52*b* of the second metal sheet 52 and the side frame portion 53*b* of the third metal sheet 53.

The third reinforcement member 58 further has a third frame edge 58*f*, which is the −X-directional edge at the −Z-directional end region of the second frame portion 58*c*. The third frame edge 58*f* is joined by spot welding to the side frame portion 51*b* of the first metal sheet 51.

The first support column portion 66 made up of the above components and extending in the Z-axis direction is formed at the +X-directional end of the rear frame 50. The first support column portion 66 is formed as a hollow support column having a quadrangular shape when viewed in the Z-axis direction. The +X-directional sidewall of the first support column portion 66, as a part of the first support column portion 66, is constituted of the side frame portion 52*b* and the side frame portion 53*b*, which are formed by bending the +X-directional end portion of the rear frame 50, and the third frame portion 58*e* of the third reinforcement member 58. The −Y-directional sidewall of the first support column portion 66, as a part of the first support column portion 66, is constituted of the main frame portion 52*a* and the main frame portion 53*a*. The −X-directional sidewall of the first support column portion 66, as a part of the first support column portion 66, is constituted of the first frame portion 58*a* of the third reinforcement member 58 and the side frame portion 51*b* of the first metal sheet 51. The +Y-directional sidewall of the first support column portion 66, as a part of the first support column portion 66, is constituted of the second frame portion 58*c* of the third reinforcement member 58.

As described above, a part of the first support column portion 66 is formed as a bent portion of the rear frame 50. This structure makes it possible to manufacture the first support column portion 66 at low cost. The third reinforcement member 58 constitutes a part of the first support column portion 66.

The side frame portion 51*b*, which is a bent portion at the +X-directional end of the first metal sheet 51, is bent at a position that is different from that of the side frame portion 52*b*, which is a bent portion at the +X-directional end of the second metal sheet 52, and that of the side frame portion 53*b*, which is a bent portion at the +X-directional end of the third metal sheet 53.

Figure 8:
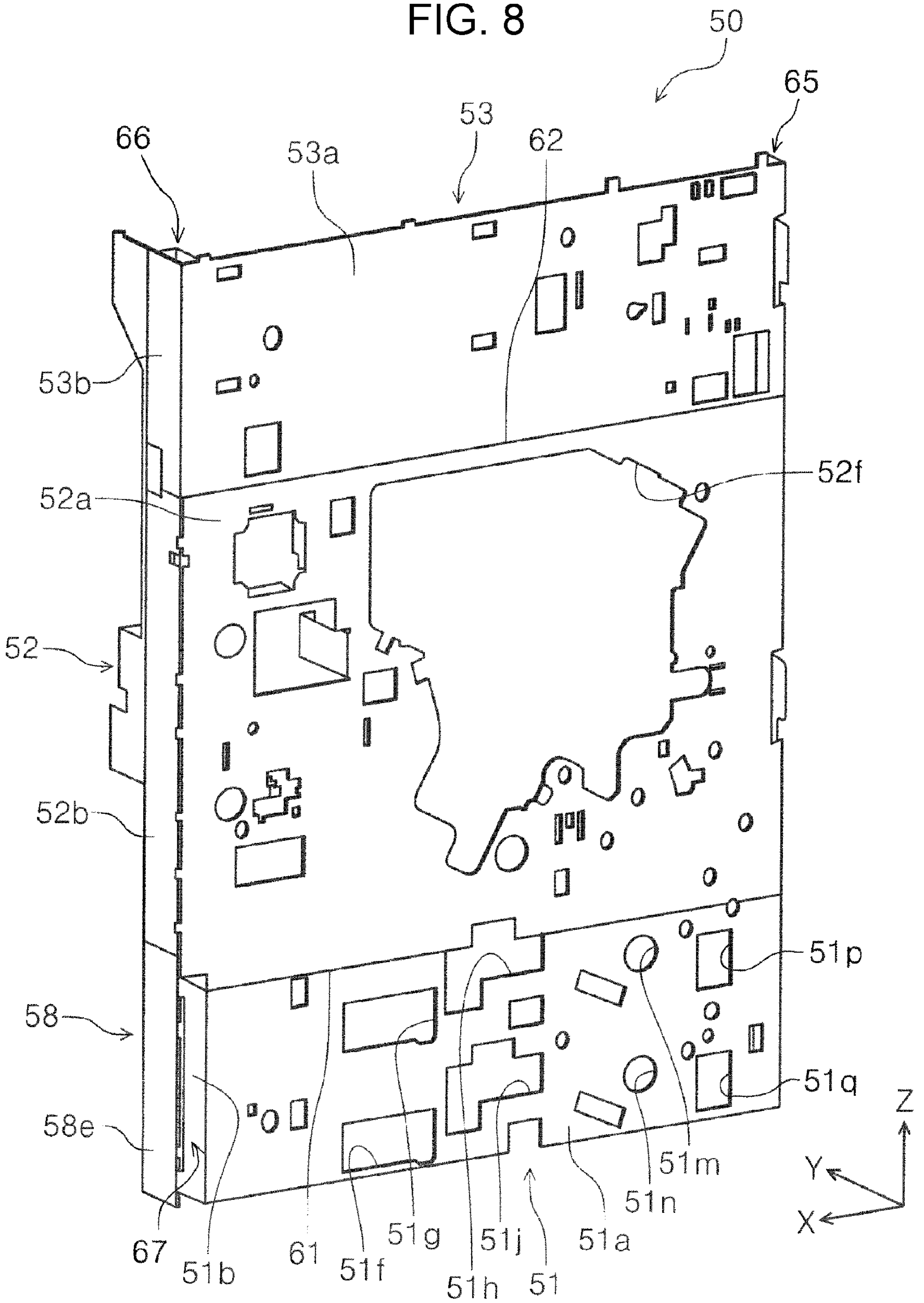
FIG. 8 is a front perspective view of the rear frame.
Figure 9:
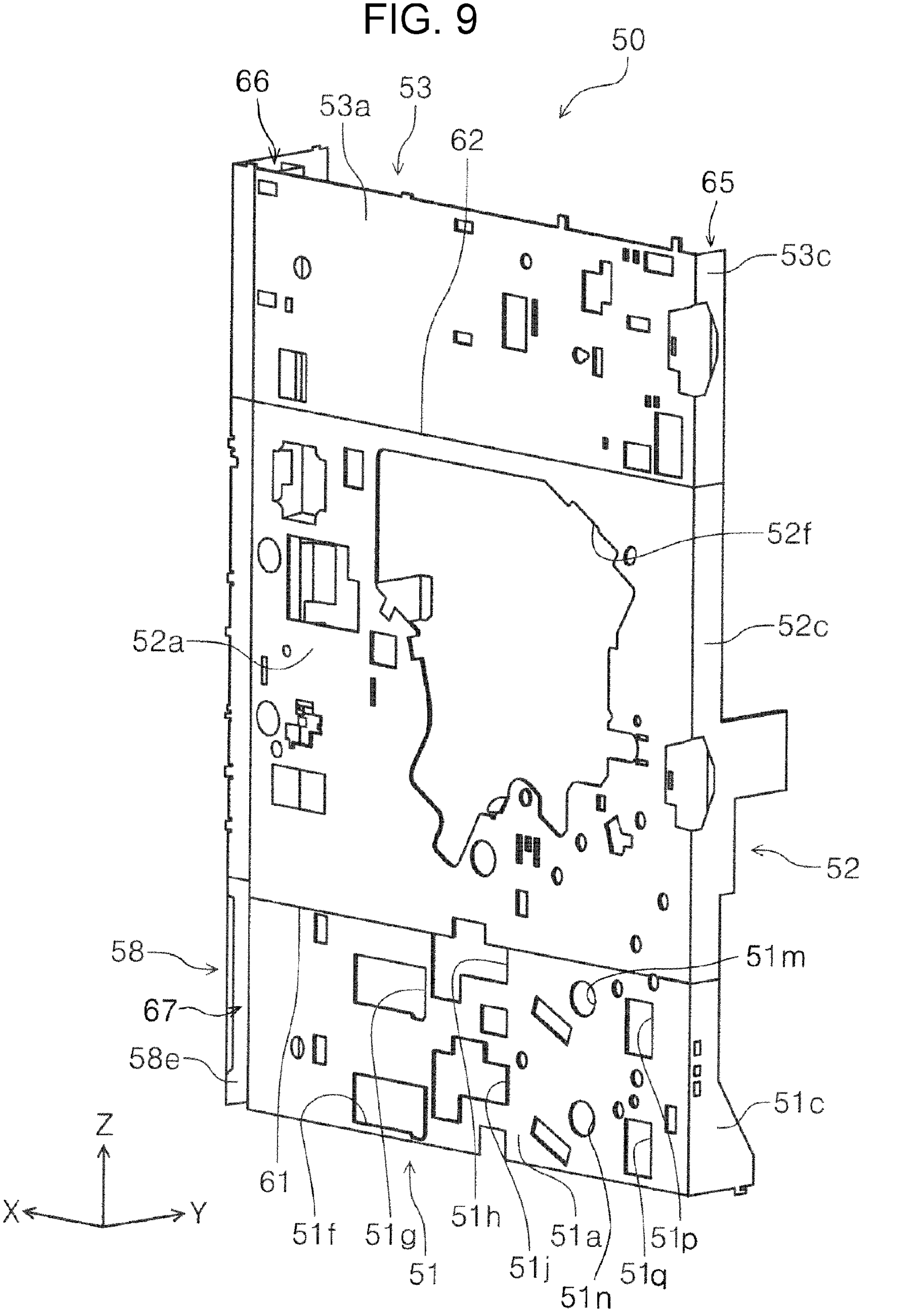
FIG. 9 is another front perspective view of the rear frame.
Figure 15:
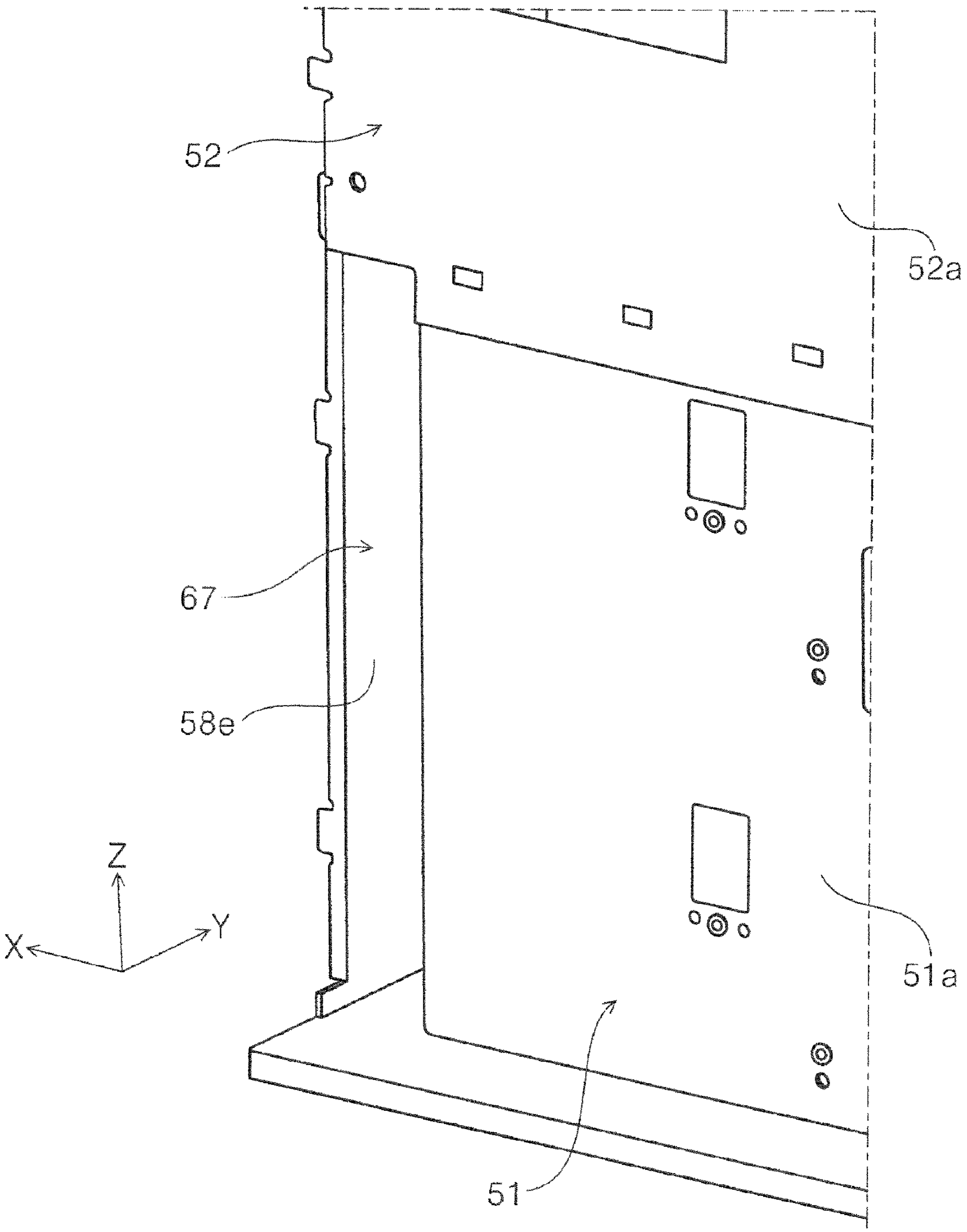
FIG. 15 is a partially enlarged perspective view of the rear frame.

Specifically, the side frame portion 51*b* is bent at a comparatively −X-directional position in comparison with the side frame portion 52*b* and the side frame portion 53*b*. Because of this structure, an accommodating portion 67 having its opening in the −Y direction is formed as illustrated in FIGS. 8, 9, and 15 at the −Z-directional region of the first support column portion 66. The accommodating portion 67 will be described later.

As described above, the printer 1, which is an example of a recording apparatus and an example of a medium transportation apparatus, includes the rear frame 50 forming a plane that is along the side 2*a*, namely, along one of lateral faces of the apparatus. The rear frame 50 is an integrated frame formed by welding the first metal sheet 51 and the second metal sheet 52 together.

This structure makes it possible to reduce the cost of manufacturing the rear frame 50. In addition, since the first metal sheet 51 and the second metal sheet 52 are joined together by welding, it is possible to prevent a decrease in the strength of the rear frame 50 as a whole.

As illustrated in FIG. 1, the first metal sheet 51 supports the feeding unit 1*a*, and the second metal sheet 52 supports the recording unit 1*b*. The third metal sheet 53 supports the ejecting unit 1*c*. That is, each metal sheet supports the functional region of the corresponding one of the feeding unit 1*a*, the recording unit 1*b*, and the ejecting unit 1*c* individually. Therefore, it is possible to prevent the positional displacement of parts inside each functional region, and it is possible to fulfill the function in each functional region properly.

The printer 1 includes the first reinforcement member 55, which is disposed in such a way as to extend across the boundary/junction between the first metal sheet 51 and the second metal sheet 52 and is welded to the first metal sheet 51 and the second metal sheet 52, and the second reinforcement member 56, which is disposed in such a way as to extend across the boundary/junction between the second metal sheet 52 and the third metal sheet 53 and is welded to the second metal sheet 52 and the third metal sheet 53. The reinforcement further enhances the strength of the rear frame 50. As compared with a structure in which the first reinforcement member 55 and the second reinforcement member 56 are configured as a single integral component, it is possible to avoid an increase in the size of the reinforcing structure, thereby reducing the cost of manufacturing the first reinforcement member 55 and the second reinforcement member 56.

The common reinforcement member 57 is used in common for the first reinforcement member 55 and the second reinforcement member 56. Using such a common part makes it possible to further reduce the cost of manufacturing the first reinforcement member 55 and the second reinforcement member 56.

The method for manufacturing the rear frame 50 according to the present embodiment includes a step of forming an integrated frame by welding the first metal sheet 51 and the second metal sheet 52 together (step S2 in FIG. 14). This process makes it possible to reduce the cost of manufacturing the rear frame 50. In addition, since the first metal sheet 51 and the second metal sheet 52 are joined together by welding, it is possible to prevent a decrease in the strength of the rear frame 50 as a whole.

The upper edge 51*d* of the first metal sheet 51 and the lower edge 52*e* of the second metal sheet 52 are positioned in abutment with each other, and the upper edge 52*d* of the second metal sheet 52 and the lower edge 53*d* of the third metal sheet 53 are positioned in abutment with each other (step S1 in FIG. 14). In this state, the edges are welded together (step S2 in FIG. 14). That is, the metal sheets are welded together in a state in which there is no gap therebetween. Because of this gapless welding, it is possible to ensure high dimensional precision of the rear frame 50 as a whole and enhance the strength thereof.

Figure 16:
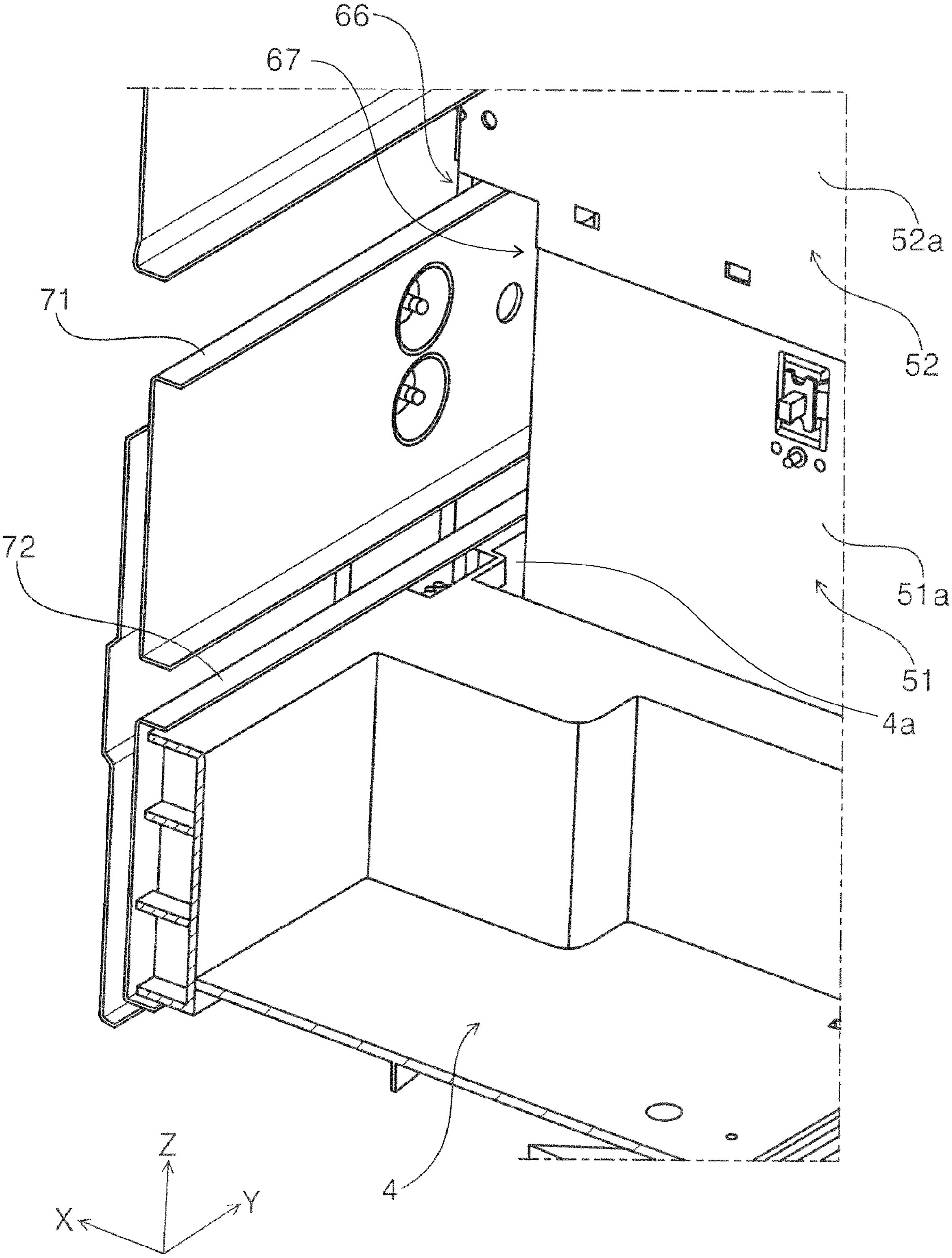
FIG. 16 is another partially enlarged perspective view of the rear frame, wherein a part of a second medium cassette is also shown with its cross section.

Next, the accommodating portion 67 provided at the −Z-directional end portion of the first support column portion 66 will now be explained. In FIG. 16, the reference numeral 71 denotes a guide rail for guiding the first medium cassette 3 in the Y-axis direction. The guide rail 71 illustrated in FIG. 16 is, of a pair of guide rails, the one located on the +X-directional side with respect to the first medium cassette 3. A similar guide rail is provided on the −X-directional side with respect to the first medium cassette 3, though not illustrated.

Similarly, in FIG. 16, the reference numeral 72 denotes a guide rail for guiding the second medium cassette 4 in the Y-axis direction. The guide rail 72 illustrated in FIG. 16 is, of a pair of guide rails, the one located on the +X-directional side with respect to the second medium cassette 4. A similar guide rail is provided on the −X-directional side with respect to the second medium cassette 4, though not illustrated.

Since the guide rails 71 and 72 are provided as described above, when, for example, the second medium cassette 4 is drawn out from the apparatus body 2, the first protruding portion 4*a* (see FIGS. 17 and 18) is supported by the guide rail 72, meaning that the second medium cassette 4 is held so as not to come off from the apparatus body 2.

The guide rail 71, 72 provided on the +X-directional side with respect to the corresponding medium cassette extends to the inside of the first support column portion 66 through the accommodating portion 67 as illustrated in FIG. 16. When a medium cassette as represented by the second medium cassette 4 in FIG. 16 is located at the +Y-directional end position, that is, at the attachment position, the first protruding portion formed on the +X-directional end of the medium cassette goes into the inside of the first support column portion 66 through the accommodating portion 67. In FIG. 16, the first protruding portion 4*a* formed on the second medium cassette 4 goes into the inside of the first support column portion 66 through the accommodating portion 67. The accommodating portion 67 is made up of the second frame portion 58*c*, the third frame portion 58*e*, and the side frame portion 51*b*. That is, a part of the accommodating portion 67 is formed by bending the first metal sheet 51.

As explained above, each medium cassette has a first protruding portion and a second protruding portion, each of which protrudes in the +Y direction, at respective +Y-directional ends thereof. As an example of such a first protruding portion and a second protruding portion, the first protruding portion 4*a* and the second protruding portion 4*b* formed on the second medium cassette 4 are shown in FIGS. 16, 17, and 18. The accommodating portion 67 serving as a receptacle that accommodates the first protruding portion formed on the +X-directional end of each medium cassette is formed in the first support column portion 66. Because of this structure, it is possible to avoid an increase in the size of the apparatus as compared with a structure in which the first protruding portion formed on each medium cassette is shifted from the first support column portion 66 in the horizontal direction.

In the present embodiment, of the first support column portion 66 and the second support column portion 65, which are arranged at a distance from each other in the X-axis direction, the accommodating portion 67 is formed in the one located on the +X-directional side, namely, in the first support column portion 66. In addition, in the present embodiment, of the plurality of protrusions formed on each medium cassette, the one located on the +X-directional side, namely, the first protruding portion 4*a*, is configured to go into the accommodating portion 67. However, a similar opening may be formed in the second support column portion 65, and, of the plurality of protrusions formed on each medium cassette, the one located on the −X-directional side, namely, the second protruding portion 4*b*, may be configured to go into the inside of the second support column portion 65. Alternatively, the respective protrusions may be configured to go into the inside of the first support column portion 66 and the inside of the second support column portion 65.

In the present embodiment, the second protruding portion formed on the −X-directional end of each medium cassette is configured to go beyond the first metal sheet 51 in the +Y direction through the openings 51*p* and 51*q* (see FIGS. 6 to 9) formed in the first metal sheet 51.

In the present embodiment, a power supply unit 75, the size detection unit 76, the movement control unit 77, and the bottom plate driving unit 78 are arranged by utilizing the space between the first support column portion 66 and the second support column portion 65 as illustrated in FIG. 19. The power supply unit 75 is a power source that supplies power for the entire apparatus.

As illustrated in FIG. 19, in a state in which the second medium cassette 4 is housed inside the apparatus body 2, at least a part of the first protruding portion 4*a* having entered the first support column portion 66 overlaps with the power supply unit 75, the size detection unit 76, the movement control unit 77, and the bottom plate driving unit 78 in the Y-axis direction. In FIG. 19, the range denoted as Ya is the range of presence of the first protruding portion 4*a* in the Y-axis direction. In the present embodiment, every one of the power supply unit 75, the size detection unit 76, the movement control unit 77, and the bottom plate driving unit 78 is partially or entirely within the range Ya. In other words, at least a part of the first protruding portion 4*a* overlaps with the power supply unit 75, the size detection unit 76, the movement control unit 77, and the bottom plate driving unit 78 in the Y-axis direction.

This structure makes it possible to avoid an increase in the size of the apparatus, especially, the size of the apparatus in the Y-axis direction. In the present embodiment, as described above, every one of the power supply unit 75, the size detection unit 76, the movement control unit 77, and the bottom plate driving unit 78 is partially or entirely within the range Ya. However, the above structure may be modified by configuring such that at least one of the power supply unit 75, the size detection unit 76, the movement control unit 77, and the bottom plate driving unit 78 is partially or entirely within the range Ya.

The scope of the present disclosure is not limited to the foregoing embodiments. The present disclosure can be modified in various ways within the scope of the recitation of appended claims. Needless to say, such modifications are within the scope of the present disclosure.

For example, although the rear frame 50 described in the foregoing embodiment is made up of three metal sheet members, specifically, the first metal sheet 51, the second metal sheet 52, and the third metal sheet 53, the rear frame 50 may be made up of two metal sheet members, specifically, the first metal sheet 51 and the second metal sheet 52, or four metal sheet members or more. In the foregoing embodiment, the rear frame 50 only is formed as an integrated frame by welding a plurality of metal sheet members together. However, the front frame 49 (see FIG. 3) also may be formed as an integrated frame by welding a plurality of metal sheet members together.

What is claimed is:

1. A recording apparatus, comprising:

an apparatus body that includes a recording unit that performs recording on a medium;

a medium cassette configured to contain the medium and configured to slide in a first direction and a second direction, the first direction being a direction in which the medium cassette is drawn out from the apparatus body, the second direction being an opposite of the first direction and being a direction in which the medium cassette is housed into the apparatus body; and a support column portion extending in a height direction of the apparatus body, wherein the apparatus body includes a frame forming a plane that is along the lateral face of the apparatus body at the second direction side, the medium cassette has, at an end in the second direction, a protruding portion that protrudes in the second direction, the support column portion is located at an end of the frame in an apparatus width direction, the apparatus width direction being a direction intersecting with the slide directions of the medium cassette, and an accommodating portion configured to accommodate the protruding portion is formed in the support column portion.

2. The recording apparatus according to claim 1, wherein a part of the support column portion is formed as a bent portion of the frame.

3. The recording apparatus according to claim 2, wherein a part of the support column portion is formed of a reinforcement member attached to the frame.

4. The recording apparatus according to claim 3, wherein the accommodating portion is formed of the reinforcement member and the frame.

5. The recording apparatus according to claim 1, further comprising:

a power supply unit that is a power source for the apparatus body;

a detection unit that detects a size of the medium contained in the medium cassette;

a bottom plate driving unit that is a driver for elevating a bottom plate provided on the medium cassette; and a movement control unit that controls movement of the medium cassette when the medium cassette is housed into the apparatus body;

wherein in a state in which the medium cassette is housed inside the apparatus body, at least a part of the protruding portion overlaps with at least one of the power supply unit, the detection unit, the bottom plate driving unit, or the movement control unit in the slide directions of the medium cassette.

6. The recording apparatus according to claim 1, wherein the frame is an integrated frame formed by welding a first metal sheet and a second metal sheet together, and at least a part of the accommodating portion is formed by bending the first metal sheet.

7. The recording apparatus according to claim 6, further comprising:

a feeding unit located below the recording unit and configured to feed the medium toward the recording unit; wherein the second metal sheet is located above the first metal sheet, the first metal sheet supports the feeding unit, and the second metal sheet supports the recording unit.

* * * * *